United States Patent
Riman et al.

(10) Patent No.: US 9,266,147 B2
(45) Date of Patent: Feb. 23, 2016

(54) PRECURSORS AND TRANSPORT METHODS FOR HYDROTHERMAL LIQUID PHASE SINTERING (HLPS)

(71) Applicant: Rutgers, The State University of New Jersey, New Brunswick, NJ (US)

(72) Inventors: Richard E. Riman, Belle Mead, NJ (US); Vahit Atakan, West Windsor, NJ (US); John P. Kuppler, Green Brook, NJ (US); Kenneth M. Smith, Somerset, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 158 days.

(21) Appl. No.: 14/041,869

(22) Filed: Sep. 30, 2013

(65) Prior Publication Data

US 2014/0093659 A1    Apr. 3, 2014

Related U.S. Application Data

(60) Provisional application No. 61/708,423, filed on Oct. 1, 2012.

(51) Int. Cl.
| | |
|---|---|
| *B05D 7/22* | (2006.01) |
| *C04B 41/45* | (2006.01) |
| *C04B 38/00* | (2006.01) |
| *C04B 35/00* | (2006.01) |

(52) U.S. Cl.
CPC .............. *B05D 7/22* (2013.01); *C04B 38/0096* (2013.01); *C04B 41/4556* (2013.01)

(58) Field of Classification Search
None
See application file for complete search history.

(56) References Cited

U.S. PATENT DOCUMENTS

| | | | |
|---|---|---|---|
| 5,880,080 A * | 3/1999 | Amory et al. ................. | 510/320 |
| 8,105,967 B1 | 1/2012 | Martin | |
| 2007/0007678 A1 | 1/2007 | Benitsch | |
| 2009/0142578 A1 | 6/2009 | Riman et al. | |
| 2010/0119807 A1 | 5/2010 | Lane et al. | |
| 2012/0156370 A1 | 6/2012 | Tontrup et al. | |

* cited by examiner

*Primary Examiner* — William Phillip Fletcher, III
(74) *Attorney, Agent, or Firm* — Dentons US LLP

(57) ABSTRACT

A method of producing a monolithic ceramic body from a porous matrix includes providing a porous matrix having interstitial spaces, providing an infiltrating medium comprising a solvent and at least one reactive species, and infiltrating at least a portion of the interstitial space of the porous matrix with the infiltrating medium. The solvent is an inert medium that is not chemically reactive with the porous matrix, and is in a liquid phase when in the portion of the interstitial space of the porous matrix. The infiltrating medium is mechanically convected through the porous matrix. The at least one reactive species, when in a portion of the interstitial space of the porous matrix, reacts with a portion of the porous matrix to form a product, and the product fills at least a portion of the interstitial space.

17 Claims, 5 Drawing Sheets

PRECURSORS AND TRANSPORT METHODS FOR HYDROTHERMAL LIQUID PHASE SINTERING (HLPS)

This application claims priority to U.S. Provisional Application No. 61/708,423, filed on Oct. 1, 2012, which is incorporated herein by reference. All references cited herein are incorporated by reference in their entirety.

BACKGROUND OF THE INVENTION

A number of previously known infiltration methods have been used to produce multicomponent ceramics or ceramic composites. These methods include: (1) metal-matrix infiltration, (2) melt processing, (3) chemical vapor infiltration (CVI), (4) nitridation, (5) chemically bonded ceramic processing, and (6) ceramic hardening infiltration.

All six methods may be used to infiltrate a previously shaped ceramic particulate porous matrix or preform (commonly referred to as green body). However, the porosity of the initial fiber or preform in these methods often needs to be minimized at the beginning of each process so that the shape of the sintered product does not differ substantially from that of the initial preform.

The importance of an infiltration medium for creating a bonded monolithic structure as well as increasing or lowering the density of a monolithic body has been described in U.S. Pat. No. 8,114,367 and U.S. patent application Ser. No. 12/71,513 via a method described collectively as hydrothermal liquid phase sintering (HLPS) that can be performed at relatively low temperatures and low pressures.

In many cases, it is desirable for the ceramic or ceramic composite product to have a uniform microstructure with respect to phase and composition. It is also desirable to conduct HLPS reactions in a relatively short time frame instead of a long time frame, such as in the case where large thick monolithic bodies are required for various applications, such as for roads or bridges. For this reason, it is desirable to balance the rate of reaction and mass transport for the HLPS method.

For example, low temperature solidification carbonation technology is a promising replacement for Portland cement technology because it produces hydrate-free cement (HFC). Unfortunately, the solidification process requires the delivery of liquid water and gaseous $CO_2$ in every region of the microstructure. This can be troublesome for several reasons. First, thick microstructures can limit the transport of either of these components. Second, there are remote regions where supply of $CO_2$ or water could be scarce or costly. Third, the amount of $CO_2$ required in systems where a high degree of carbonation is required is extensive. For example, an 11-inch thick 30-ft wide roadbed that has 10 wt % HFC carbonated at about 50% requires 282 tons of $CO_2$ per mile. This amounts to about 7-14 truckloads of liquid $CO_2$. Thus, shipping this much $CO_2$ implies that there could be logistics problems associated with its delivery. Looking at water, the main problem with this component is being sure that the liquid is uniformly distributed and partially fills the pore volume so that gas diffusion can occur simultaneously. For thick beds of road, both liquid and gas transport must be accommodated simultaneously. Given the pore size of packed particle beds and the substantially larger viscosity and density of fluids compared to gases, there is a problem that a percolation network of filled pores can create a barrier to $CO_2$ transport, thus inhibiting the carbonation process.

Thus, the strategy for the precursor choice (i.e. solvent and reactive species) and method of introducing the precursors comprising the infiltration medium is critical.

BRIEF SUMMARY OF THE INVENTION

In one embodiment, a method of producing a monolithic ceramic body from a porous matrix including providing a porous matrix having interstitial spaces, providing an infiltrating medium comprising a solvent and at least one reactive species, and infiltrating at least a portion of the interstitial space of the porous matrix with the infiltrating medium. The solvent is an inert medium that is not chemically reactive with the porous matrix, and is in a liquid phase when in the portion of the interstitial space of the porous matrix. The infiltrating medium flows through the porous matrix. The at least one reactive species, when in a portion of the interstitial space of the porous matrix, reacts with a portion of the porous matrix to form a product, and the product fills at least a portion of the interstitial space.

In another embodiment, a method of forming a monolithic body from a porous matrix includes providing a porous matrix having interstitial spaces, introducing a deliquescent solid into at least a portion of the interstitial spaces of the porous matrix, and infiltrating at least a portion of the porous matrix with an infiltrating medium. The infiltrating medium includes a solvent and at least one reactive species. The solvent is an inert medium that is not chemically reactive with the porous matrix, and solvent contacts the deliquescent solid. The at least one reactive species, when in a portion of the interstitial space of the porous matrix, reacts with a portion of the porous matrix to form a product, and the product fills at least a portion of the interstitial space.

Further embodiments, features, and advantages of the precursors and transport method for HLPS are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS/FIGURES

FIG. 1 represents g-rHLPD process Schematic. A—Dried porous $CaSiO_3$ preform; B—Partially wet $CaSiO_3$ preform; C—Final densified monolithic solid. Steps 1 to 4 represent the carbonation-densification process occurring in an individual pore: Step 1-Partially wet pore with $CO_2$; Step 2—Diffusion, dissolution and dissociation of $CO_2$; Step 3—Dissolution of $CaSiO_3$ by hydrogen ions; Step 4—Precipitation of solids. After the completion of step 4, the process takes place continuously following steps 2-4 until various kinetic factors slow down the process (e.g., thick $SiO_2$ reaction layers).

DETAILED DESCRIPTION OF THE INVENTION

Figure 1:
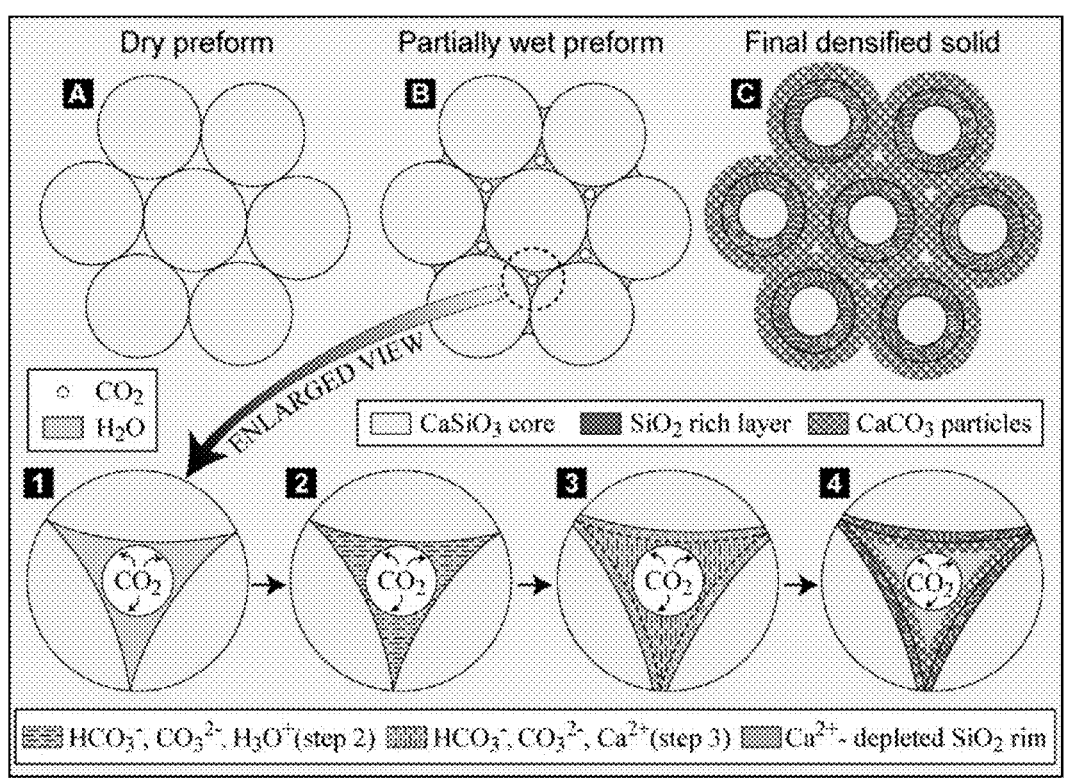

Reference will now be made in detail to embodiments of the precursors and transport methods for hydrothermal liquid phase sintering (HLPS) with reference to the accompanying figures, in which like reference numerals indicate like elements.

Embodiments relate to the precursors chosen for the infiltrating medium as well as methods for introducing the infiltrating medium into the porous matrix. As discussed above, the selection of the precursors for the infiltrating medium and the method of transporting the precursors are important to controlling the balance between the rate of reaction and mass transport for a HLPS process.

The infiltration medium includes a first precursor and a second precursor. The first precursor is a solvent and a second precursor is a reactive species.

The solvent is a component that can form at least in part a liquid phase when in the green porous matrix and can be removed at the end of the HLPS process by various mass transport processes.

The solvent can be aqueous or non-aqueous. The solvent can include one or more components. For example, in some embodiments, the solvent can be, but not limited to, water and ethanol, ethanol and toluene or mixtures of various ionic liquids, such as ionic liquids based on alkyl-substituted imidazolium and pyridinium cations, with halide or trihalogenoaluminate anions. Wetting systems are preferred over non-wetting in order to simplify processing equipment.

The solvent should not be chemically reactive with the porous matrix, although the solvent may chemically react with reactive species. The solvent can be removed via a variety of separation methods such as bulk flow, evaporation, sublimation or dissolution with a washing medium, or any other suitable separation method known to one of ordinary skill in the art.

The role of the solvent contrasts with prior art involving reactive systems, such as, for example, Portland cement, where a solvent such as water reacts with a porous matrix to form products that contain solvent molecules, such as metal hydrates or metal hydroxides, among other precipitation products. Other contrasting prior art includes reactions involving molten metal and porous matrices to form reaction products that contain both the molten metal element and some component in the matrix. Thus, again, this application utilizes a solvent that does not react substantially with the porous matrix; rather the reactive species reacts with at least a portion of the porous matrix.

The reactive species may come from raw materials in the pure (i.e. their natural state) state as solid, liquid and gas phases. Regardless of the phase of the pure reactive species, the reactive species dissolve in the solvent as neutral, anionic or cationic species. For example, in one embodiment, the at least one reactive species may be a solid such as $Na_2CO_3$ that can easily dissolve in a water solvent as mostly carbonate and sodium ions. In other embodiments, the at least one reactive species can be in a liquid phase. For example, the reactive species can be tri-ethyl phosphate in a liquid phase that can dissolve in water as a neutral molecule, but when heated to an elevated temperature, it will form both charged and neutral species. In further embodiments, the at least one reactive species can be a gas that dissolves in the solvent. For example, the at least one reactive species can be carbon dioxide, which is a gas at room temperature that can dissolve in water as neutral $CO_2$ but can create reactive species via reaction with the solvent such as, for example, $H_3O^+$, $HCO_3^-$, $H_2CO_3$ and $CO_3^{2-}$ species. In the case of complex multicomponent systems (i.e. systems comprising more than one reactive species), the more than one reactive species could be comprised of combinations of solid, liquids and gases that dissolve in a solvent. Regardless of the initial phase of the reactive species and the solvent in the pure state at room temperature and pressure (also referred to as natural state), the infiltration medium is in a liquid phases in the pores (i.e. interstitial spaces) of the porous matrix. More specifically, the solvent is a liquid at the temperature where the dissolved reactive species react with the porous matrix. This temperature will vary depending on the specific solvent and reactive species chosen. Low temperatures are preferred over higher ones to save energy and simplify processing equipment thereby reducing manufacturing costs.

As mentioned above, selection of the solvent and the at least one reactive species is very important with respect to the present invention so too is the method used to introduce the infiltration medium including the solvent and reactive species into the porous matrix to achieve an uniform or a gradient microstructure in the monolithic structure or body.

In one embodiment, capillary forces can be used to wick the infiltration medium into a porous matrix spontaneously. This type of wetting occurs when the infiltration medium has a very low contact angle (e.g., <90°). In this case, the medium can partially fill (partially saturate) or fully fill (saturate) the pores. The infiltration can also take place in such a manner that some pores are filled while others are empty and/or partially filled. It is also possible that an infiltrated porous matrix with gradients in pore filling or saturation can be later transformed to one that is uniform via capillary flow via multiple approaches such as extended heating in a solvent-saturated atmosphere. In addition, wetting does not spontaneously occur when the contact angle of the infiltration medium is high (>90°). In these cases, fluids will not infiltrate the porous matrix unless external pressure is applied. However, this approach has utility when it is desirable to withdraw the infiltration medium by the release of pressure. In this case, a reaction can be initiated or halted by pressure.

When infiltration (i.e. transport of the infiltrating medium into at least a portion of the porous matrix) is done using spontaneous capillary flow in the pores, the bulk flow ceases when the pores are filled (saturated). During HLPS, the reactive species react with the matrix to form one or more products by the various reactions outlined in U.S. Pat. No. 8,114,367 and U.S. patent application Ser. No. 12/271,513. During these reactions, the at least one reaction species is depleted from inside the pore space and thus need to be replenished during the course of the reaction. When pores are fully saturated with the infiltration medium, the reactive species must be transported from the infiltration medium external to the porous matrix through the matrix pores. In a quiescent fluid, diffusion is the process by which transport takes place. Thus for some HLPS methods whose reactions inside the pores are fast relative to all other mass transport processes, the reaction becomes limited by large increases in the porous matrix thickness in which case only the outer portion of the matrix reacts extensively with the reactive species, while inner regions of the porous matrix are either less completely reacted or unreacted. Thus, this type of reaction is suitable for preparation of gradient microstructures where the concentrations of products of the HLPS process (with respect to chemical and/or phase composition) are higher on the outside portion (near external surface regions) versus the interior of the structure.

For cases where highly exothermic reactions proceed slowly relative to transport of the infiltration medium and the matrix is thermally insulating, entrapped heat can increase the rate of reaction in the interior of the matrix to enable its interior to contain more product phase (i.e. the product of the reaction between the at least one reactive species and a portion of the porous matrix) than its interior. For other HLPS processes whose reactions isothermally proceed at an intermediate rate relative to mass transport of the infiltration medium, diffusion may have the capability to continue to supply the pores with reactive species and thus, no gradient in the degree of reaction (or product concentration) will be observed. Thus, in this case, there is little difference in the chemical and/or phase composition from the interior to the exterior of the material of the monolithic structure or body.

In many cases, a uniform microstructure with respect to phase and composition is desirable in the monolithic structure body. Furthermore, it is also desirable to conduct HLPS reactions in a relatively short time frame, such as in the case where large thick monolithic bodies are required for applications such as for roads or bridges. For this reason, it is desirable to balance the rate of reaction and mass transport for HLPS processes. Thus, the strategy for precursor choice and method of introducing the precursors to comprise the infiltration medium is critical.

The best choice of precursors and method of introducing the infiltration medium (i.e. the process of transporting the precursors from the exterior of the porous matrix to the at least a portion of the interstitial space of the porous matrix) is at least in part a function of the sample thickness in the thinnest direction, the time scale considered acceptable for the process and the thermodynamic and kinetic constraints needed for the process to be commercially viable, such as temperature, pressure and composition. The precursor choice and method of introduction strategies are summarized in Table 1.

The porous matrix can be directly infiltrated as indicated by this table or the porous matrix may be evacuated prior to any of the infiltration sequences described in Table 1. Methods are described that use gases as precursors, liquids as precursors or solids as precursors. In addition, phase mixtures such as solids and liquids, gases and liquids and gas and solids can all be used. This is all possible as long as the precursor combination results in a solution that can reside in the pores of the matrix. For example, a reactant such as $CO_2$ is a gas in its pure state but is converted to a solution species when it diffuses into water. Such an event can come about by gaseous diffusion into the porous matrix and subsequent condensation when a pore is encountered. This type of precursor system is relevant when microstructures consisting of carbonate phases are desired. Solid phases such as $Sr(OH)_2 \cdot 8H_2O$ can melt when heated above 100° C. It can infiltrate as a liquid phase into a porous matrix followed by infiltration of liquid water to form reactive species relevant for the formation of strontium titanate to densify (i.e., sinter) a porous body of titania.

The order of addition of the precursors (solvent and reactive species) can influence the reaction yield and microstructure of the material. Examples of methods of precursor addition are shown in Table 1 (Methods of Introduction).

TABLE 1

Precursors and Methods of Introduction for HLPS Processes (Note: gas means either a gas or vapor phase)

| System | Reactive Species | Solvent | Deliquescent Material | Methods of Introduction |
|---|---|---|---|---|
| (1) | Gas | Gas | | Premixing (parallel introduction) two gases and introducing them to a lower temperature to condense one or more gas species in the matrix to comprise an infiltrating solution containing reactive species and solvent or condense the gas mixture in the matrix by cooling the matrix or utilize a porous matrix that possesses Kelvin pores to condense the gas phase in the matrix. Gases can also be introduced in series where one gas is condensed prior to infiltration or after infiltration and the other is introduced afterwards to dissolve in the liquid phase. The reverse order is possible but the reaction yield could be reduced. |
| (2) | Gas | Gas | Solid | Pre-mixing deliquescent solid with matrix, pre-mix gases (parallel introduction) then flow and/or diffuse the gas mixture through the matrix to form infiltrating solution Gases can be introduced in series into the deliquescent solid-matrix pre-mixture. The preferred order is to have the gas that liquefies the deliquescent solid and then the gas that dissolves to form reactive species. The reverse order is acceptable but the reaction yield could be reduced |
| (3) | Gas | Liquid | Solid | Premixing of deliquescent solid with matrix, then infiltrate with liquid solvent, then add gas (or visa-versa) to form infiltrating solution in |

TABLE 1-continued

Precursors and Methods of Introduction for HLPS Processes (Note: gas means either a gas or vapor phase)

| System | Reactive Species | Solvent | Deliquescent Material | Methods of Introduction |
|---|---|---|---|---|
| | | | | matrix pores. Reverse order of gas and liquid is possible but may result in reduced reaction yield<br>or<br>Gas and liquid could be pre-mixed as a solution for introduction into the deliquescent solid-matrix pre-mixture but reaction yield might be reduced |
| (4) | Liquid | Liquid | | Pre-mix (parallel introduction) fluids then infiltrate matrix.<br>or<br>Infiltrate fluids through matrix in series with preferred ordering being liquid solvent prior to liquid that provides reactive species. |
| (5) | Liquid | Liquid | Solid | Premixing of deliquescent solid with matrix, then add liquid solvent to dissolve deliquescent solid, then add liquid reactive species (or visa-versa) to form infiltrating solution.<br>or<br>Pre-mixed solvent and reactive species in liquid phases as an infiltration solution for introduction into the deliquescent solid-matrix pre-mixture |
| (6) | Liquid | Gas | | Infiltrate matrix with gas and condense in matrix as liquid, then infiltrate second liquid into matrix to mix with first liquid in matrix. Reverse order is also possible but not preferred due to possibility of low reaction yield.<br>or<br>Preferred route is premixing of gas and liquid by condensing gas and mixing into second liquid, then introduce solution to a porous matrix |
| (7) | Gas | Liquid | — | Infiltrate liquid then introduce gas or Pre-dissolve gas in liquid then infiltrate |
| (8) | Solid | Solid | | Mix solids with porous matrix, then pressurize or heat to form infiltration liquid. One solid may flux the other to form a liquid phase that can be removed later by washing. Other solids could be added to reduce melting temperature to form liquid phase as long as it can be removed later |
| (9) | Liquid | Solid | | Prepare infiltration solution by dissolving solid in liquid, then infiltrate<br>Or<br>Premix solid with porous matrix, then infiltrate with liquid |
| (10) | Solid | Liquid | | Prepare infiltration solution by dissolving solid in liquid, then infiltrate<br>Or<br>Premix solid with porous matrix, then infiltrate with liquid |

In some embodiments, the solvent and reactive species may be premixed to form the infiltration medium and then introduced into the matrix in a single step. In other embodiments, it may be preferable to employ multiple infiltration sequences. For example, the solvent precursor could be introduced first followed by infiltration of the reactive species or vice versa.

Neither the solvent nor the reactive species precursors need to be the same phase initially as the infiltrating medium will be a liquid that is found in the pores of the matrix. For example, the solvent precursor can be a vapor such as water, which is gaseous at temperatures at 100° C. or higher at atmospheric pressure and can be condensed to a liquid thermally by cooling the matrix to a temperature lower than 100° C. or utilizing surface energy by choosing to use porous matrices with pore sizes in the pore-size range (less than 100 nm, porous materials are classified into several kinds by their size. According to IUPAC notation (see J. Rouquerol et al., *Pure & Appl. Chem.*, 66 (1994) 1739-1758), microporous materials have pore diameters of less than 2 nm, mesoporous materials have pore diameters between 2 nm and 50 nm and macroporous materials have pore diameters of greater than 50 nm, thus, Kelvin pore sizes, as we define it, start from the lower end of the macroporous regime down through the mesoporous and microporous regimes). When the pores are large, the temperature is elevated such that gaseous species cannot be thermally or Kelvin-pore condensed or small amounts of infiltrating solution are needed to penetrate a very thick structure (e.g., 12 inches thick) or other reasons not discussed here where liquids or vapors to comprise the infiltrating solution cannot be introduced into the structure, it may be desirable to form the liquid in the pore using a deliquescent compound. Examples of such compounds include, but are not limited to, sodium chloride, potassium chloride, boric acid, magnesium nitrate, iron nitrate, and potassium hydroxide. In this case, a vapor such as water can convert the deliquescent solid phase in the pore to a liquid and crystal growth of the product phase can proceed in the pore. This is particularly useful when liquid infiltration and liquid diffusion limits the amount of the product precipitated by HLPS. In this case, alternatively, gaseous diffusion can be used to transport species over much larger distances to form the infiltration medium required for HLPS inside of the pores of the matrix.

The deliquescent solid example given above is just one example of how additives can accelerate the reaction rate or make the HLPS process more uniform throughout the porous matrix.

It is important to realize that with the use of a solvent, an array of other processing additives can be used to enhance the HLPS process in variety of ways.

Crystal growth additives influence the morphology and size of the crystals. Example for calcium carbonate crystal growth include but are not limited to impurity cations such as $Pb^{2+}$, $Mn^{2+}$, $Mg^{2+}$, $Co^{2+}$, $Fe^{2+}$, $Ni^{2+}$, and anions such as $NO_3^-$, $SO_4^{2-}$, $PO_4^{3-}$, citrate, aryl alkyl sulfonates. Example for barium sulfate crystal growth include but are not limited to citrate and dihexyl sodium succinate and nonionic species alkyl aryl polyether alcohols. In general, solvent mixtures can be used to control morphology where polar water can be mixed with polar water liquids such as ketones, alcohols, and ethers. Alternatively, non-polar solvents such as kerosene, toluene and even liquefied gases such as $CO_2$, $SF_6$ and others can be combined to alter crystal size and morphology.

Additives can be used as binders to give the porous matrix strength. Examples include colloidal particles such as clay inorganic binders and microcrystalline cellulose organic binders. Molecular binders include gums, lignin extracts, and polymers such as polyvinyl binders that include polyvinyl alcohol and polyvinyl chloride, polystyrene, polyacrylic acid, paraffin wax, and cellulose-based binders such as starch, dextrin, sodium alginate, hydroxypropyl methyl cellulose, and glycols such as polyethylene glycol. Soluble binders that include soluble silicates, metal organic silicates, organometallic silicon, silicones, soluble phosphates and soluble aluminates.

Other additives present could include internal or external lubricants to alleviate die-wall or internal particle friction, such as paraffin, stearates of aluminum, butyl, lithium, magnesium, or zinc, carboxylic acids such as stearic or oleic, polyglycols, fluoropolymers and even inorganic solids such as talc, graphite and boron nitride. Liquids used are used as fluid lubricants, which could include silicones, mineral oil, petroleum distillates, synthetic oil, aqueous emulsions, among others.

Surfactants are used to control the formation of the porous matrix and to moderate the contact angle of the infiltrating solution during hydrothermal liquid phase sintering. Examples include nonionic surfactants such as ethoxylated nonyphenol or ethoxylated tridecyl alcohol, anionic surfactants such as sodium stearate or sodium diisopropylnaphthalene sulfonate or cationic surfactants that include polyethylene imide, or dodecyltrimethylammonium chloride.

Solvents for porous matrix processing and hydrothermal liquid phase sintering include but are not limited to water, hydrocarbons, alcohols, halocarbons, ethers, amines, ketones, acetonitrile, propylene carbonate and other carbonate solvents, DMSO, amides such as Formamide and all the ionic liquids. Solvents can be used as an additive to another solvent system (the dominant solvent species in the solution) to serve a variety of functions, which include but are not limited to making the infiltrating solution less viscous, catalyzing a hydrothermal reaction, alter reaction thermodynamics and enhancing the drying kinetics of the porous matrix so that drying is sped up or slowed down to prevent cracking defects, such as what has been seen in the drying of sol-gel silicates.

Deflocculants (dispersants) and flocculants (coagulants) could be used to make suspensions, pastes, plastic bodies or slurries stable or unstable, respectively. Additives that induce flocculation include electrolytes (e.g., $KNO_3$), pH control agents (e.g., $HNO_3$, KOH). Surfactants (e.g., see above), steric stabilizers (e.g., stearyl alcohol) and electrosterics (e.g., sodium polymethacrylate), nanoparticle halos (e.g., colloidal silica) and Vold layers that use very short surfactant species, could be used to induce flocculation or deflocculation, depending on the temperature, composition and pressure of the reaction medium.

Plasticizers are used reduce the brittle character of binders so that the porous matrices do not crack during handling. Glycols (e.g., ethylene glycol) and phthalates (e.g., dibutyl phthalate) are typically employed.

Foaming/antifoaming agents are used to create porosity or to eliminate pores in the porous matrix. Common defoaming agents include fluorocarbons, dimethyl disilicones, high molecular weight alcohols, glycols and stearates of aluminum or calcium. Examples of foaming agents include tall oil, sodium alkyl sulfate and propylene glycol.

Preservatives such as bactericides or fungicides are useful when additives are not biologically inert such as but not limited to binders made of polysaccharides. When binders are like this, preservative additives such as but are not limited to hypochlorites, phenols, copper sulfate and silver nitrate.

The above additives can be incorporated to improve the HLPS process, which can be solids, liquids or gases in their pure state but either soluble in the solvent phase or co-processed as soluble or insoluble components with the matrix to form the porous matrix prior to incorporation of the infiltration medium. Aside from the above examples, there are also other numerous additives, such as but limited to: (1) nucleation catalysts (2) nucleation inhibition agents (3) solvent conditioners such as water softening agents (5) non-wetting agents (6) common or proprietary cement or concrete additives (7) additives commonly used in the building industry (9) crystal growth accelerants (catalysts) (10) additives that slow down crystal growth (11) pH buffers (12) ionic strength adjusters (13) rheological control agents that increase or decrease the viscosity of the infiltrating solution (14) hydrothermal reaction rate catalysts (15) electrostatic, steric, electrosteric, polyelectrolyte and Vold-layer dispersants (16) capping agents to prevent certain compounds in the matrix from reacting (17) coupling agents and other surface-adsorptive species (18) acid or base pH modifiers (19) additives generating gas, liquids or solids when heated, pressurized, depressurized, reacted with another species or exposed to any processing variable not listed here (20) biological or synthetic components that can serve any of the above functions as well as playing the role of providing a solvent, reactive species or porous matrix and additives that impart specific functionality such as strength enhancement, density control, electrical resistivity, optical transmissivity, etc.

In other embodiments, as indicated in Table 1, a deliquescent solid may be used. The deliquescent solid may be pre-mixed with the porous matrix. Then pre-mixture of the solvent and at least one reactive species can be introduced to the deliquescent solid-porous matrix. The solvent can contact the deliquescent solid, and the solvent and the deliquescent solid are then in a liquid phase after the contact. The solvent and at least one reactive species in the pre-mixture can be both in the gaseous phase or both in liquid phases. In other embodiments the solvent may be a liquid and the at least one reactive species may be in a gaseous phase in the pre-mixture or vice versa.

For example in one embodiment, a gas-water vapor stream can be passed over a deliquescent salt in the porous matrix to generate the infiltrating medium in a liquid phase in the interstitial space in the porous matrix. For example the humid gas-water vapor stream can serve as a solvent for $CO_2$ dissolution and ionization.

There are a large number of salts known to be deliquescent and suitable for forming liquid solutions from the flow of humid air over the salt surfaces. Selection of the appropriate salt relies on the level of humidity in the air. These salts can operate at very low relative humidities.

For example, $Mg(NO_3)_2$ can form liquid solutions at low water activities of (0.05-1. % RH). We know that at equilibrium, moist air can transform $Mg(NO_3)_2$ into a solution when the mole fraction of Mg-salt is 0.35 in water solution. A water (liquid) solution means that solution contains 65 mole % water and 35 mol % Mg-salt. This composition can occur even when the RH is 1% or less. However, higher values deliver higher mass of water per unit time. If we assume the temperature is room temperature and the RH is 50%, the porous matrix component is 1 cubic foot, the pores can be partially filled by 50% (DPS=50%) by volume with a solution that has a final composition of 0.35 $Mg(NO_3)_2$ and 0.65 $H_2O$ (the rule of mixtures is used to estimate the solution density). Assuming the porosity is 40% and that the pores are monodisperse, moist air will enter the structure and gradually the $Mg(NO_3)_2$ salt in the pores will liquefy when this composition is selected. First, pick the weight percent of Mg-nitrate to correspond to value that we can fill 50% of the pore volume. If you have a solution that contains 0.35 mol fraction of Mg-nitrate (use the rule of mixtures to estimate the density of the solution). Psychrometric calculations indicate that an airflow rate of 10.4 $m^3$/h in 3 h can deliver enough water to make an aqueous solution with a final mole fraction of 0.35 $Mg(NO_3)_2$ in water. At that point, more gas flow can continue to dilute the magnesium salt concentration and increase the DPS value (DPS, degree of pore saturation, as defined by J. Reed (Principles of Ceramic Processing, John Wiley and Sons, 1991) beyond 50%. Such an option can be useful for control of the reaction rate and fraction of porous matrix reacted (amount of product formed). Alternatively, the relative humidity can be dropped to 1% or less and the solution volume in the pore will be fixed since this solution composition will equilibrate with a low humidity gas stream. Thus, this example shows how we can avoid the use of liquid water by delivering it in a gas phase and condensing it in a pore by using a deliquescent salt. It also shows how we can precisely control the volume of fluid in each pore without having capillary forces creating a gradient in solution composition because the liquid phase will form uniformly in the bulk pore phase as the magnesium salt slowly traps more and more water vapor in the pore. A similar computation can be done at elevated temperatures such as 60° C. or 90° C. where the triggering composition for deliquescence can be computed, as well as the volume of the infiltrating solution and moisture carrying capacity of the air being used.

Other salts can be used, such as $CaCl_2$ or even NaCl. These salts require higher relative humidity to activate solution formation than $Mg(NO_3)_2$. NaCl requires a relative humidity of 75% and $CaCl_2$ solutions require a minimum relative humidity of 20%. These specific salts are also more limited in solution composition since they form insoluble compounds, such as $CaCl_2.2H_2O$ or NaCl.

The deliquescent salt additive can be co-processed where the salt serves a dual role as the binder phase for a casting slip. For example, during the casting process the salt can be dissolved in water to impart favorable mechanical properties such as tensile strength to the porous matrix during the drying step, which is when porous matrices frequently crack. Other dual or more multiple roles can be conceived for such a salt additive. During drying the salt can precipitate on the particle surfaces. Alternatively, in some embodiments, the deliquescent salt can be incorporated into a vehicle such as vermiculite, whose porosity can accommodate both water and the deliquescent salt. This compound can be a relatively insoluble phase until a specific temperature where relative humidity activates the system to liquefy and expand, creating an abundance of solution for $CO_2$ absorption and ionization.

Alternatively, the deliquescent salt can be processed in anhydrous conditions and co-granulated with the binder components of the porous matrix that can be dry mixed with other components such as aggregate or sand. The mixture can be dry compacted in the porous matrix (ceramic green body) and the mixture can form solutions in the pores via changes in relative humidity and temperature.

Figure 6:
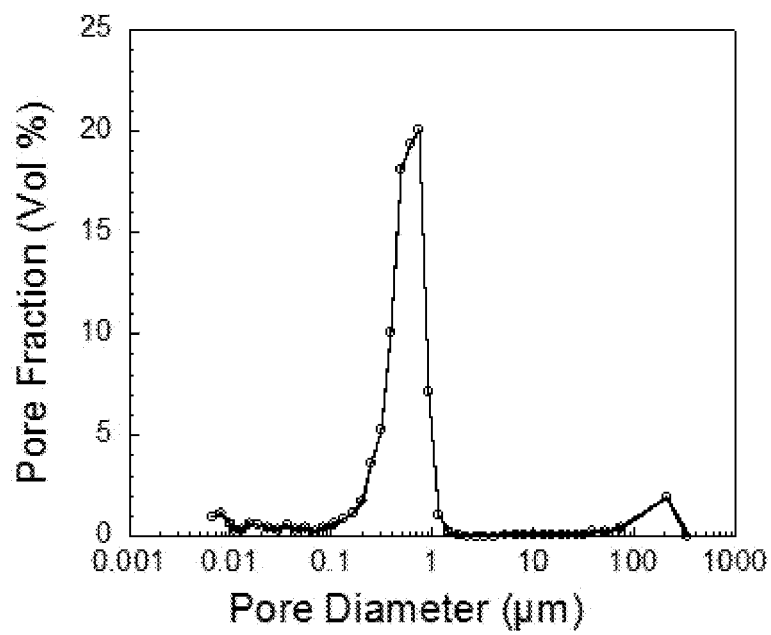
FIG. 6 represents pore size distribution of CCS1 measured by Hg-Porosimetry.

Another major advantage of deliquescent salts is the amount of the salt added and selected relative humidity determines the volume of solution added. This is because the volume of solution is determined by the equilibrium composition of the salt solution. FIG. 6 shows a deliquescence curve for $Mg(NO_3)_2$. At a water activity of 0.05 or relative humidity of 5%, this salt will remain a solid until the composition of moisture and salt correspond to a mole fraction of about 0.35 $Mg(NO_3)_2$ in water is achieved.

In other embodiments, the infiltration medium is delivered as a bulk solution that spontaneously wets the porous matrix. There are many options for delivery of this solution. First, the porous matrix can be immersed in the liquid. Second the infiltration solution can be sprayed onto the porous matrix. In a quiescent system, when there is a volume of infiltration solution that is greater than the pore volume of the porous matrix, diffusion propagates the reaction by delivering the reactive species to the pore sites. This approach is the slowest way to practice the invention.

Alternatively, the fluid can flow through the porous matrix by a variety of methods. For example, the fluid can be mechanically convected through the porous matrix. Methods such as pressurized flow, drying, electro-osmotic flow, magneto-osmosis flow, capillary, and temperature- and chemical-gradient-driven flow are all methods that can be used to flow the liquid infiltration medium through the porous body. In some cases, the solvent and reactive species may be introduced in two steps. For example in the carbonation of minerals, water could be drawn into a porous matrix by creating a vacuum on one side of the matrix (aka, pulling) with the infiltrating water on the other side. In a second step, a gas such as $CO_2$ can be pressurized to flow through the water-saturated (DPS, degree of pore saturation, as defined by J. Reed (Principles of Ceramic Processing, John Wiley and Sons, 1991) matrix to push the water born-pores free of all but a film of water remaining on the particle surfaces. That film can then subsequently act as an ionization medium for $CO_2$ to enable the carbonation reaction to proceed with the mineral. This type of process is nicknamed a Push-Pull reaction, or just Push-Pull. This dynamic flow allows fresh reactant to be near the porous matrix, as opposed to relying on diffusional processes. This approach is relevant as long as the pore size distribution of the matrix permits a reasonably high flow rate of a fluid that supplies reactive species faster than a diffusional process and is optimal when the supply rate equals or exceeds the reaction rate for product formation. In addition, flow-through of the infiltration medium is especially useful for highly exothermic reactions since the liquid medium transfers heat at rates that are three orders of magnitude faster than the gaseous medium. This is particularly relevant for monolithic structures that are thick and can generate heat internally capable of generating large internal pressures from volatile components that are capable of fracturing the monolithic structure.

In fluids, diffusional processes rate-limit a process when the thickness through which diffusion must occur is greater than the diffusion distance, which can be estimated by computation of root mean square displacement. For example, for a fluid with no convection, the diffusion of ions at room temperature and atmospheric pressure in water is approximately 0.19 cm. There are many applications where thicknesses of materials exceed this length scale. In these cases, mechanical convection of the fluid by any suitable means known to one of skill in the art is necessary. Another alternative is to introduce the solvent or reactive species as a gaseous species. When this is done, the diffusion distance increases to 9 cm. In further embodiments, supercritical conditions can be employed to achieve transport rates that lie between liquids and gases.

For mineral silicate carbonation reactions to proceed quickly, the concept of gas-assisted HLPS or in other words, gas-assisted hydrothermal liquid phase densification, rHLPD (FIG. 1). g-rHLPD utilizes partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm). Thus, a substantial quantity of $CO_2$ must be continuously supplied to and distributed throughout the porous preform to enable significant carbonate conversion. Utilizing gas phase diffusion offers a 100-fold increase in diffusion length over that of diffusing soluble $CO_2$ an equivalent time in a liquid phase. This partially infiltrated state enables the reaction to proceed to a high degree of carbonation in a fixed period of time. For example, in the partially infiltrated state, 47.5±2.7 mol % conversion of $CaSiO_3$ into $CaCO_3$ and $SiO_2$ can be achieved in ~19 h at a temperature of 90° C. and a pressure of 2.36 atm. If all the same reaction conditions are maintained except that the pores are completely filled with water, a substantially lower carbonation conversion, 3.8±0.5 mol %, results.

A suitable apparatus for g-rHLPD is an autoclave designed to enable liquid water transport to and from the porous green (unreacted) body such that open porosity is maintained either periodically or throughout the entire process. In many cases, because of the enhanced reactivity imparted by paying attention to transport of the infiltration solution, pressurization of the reaction is not required, which eliminates the need for an autoclave so that a conventional container or even a tent can be used to perform HLPS. The above capability using a simple autoclave such as a food steamer is accomplished by refluxing water vapor from the heated bottom of the autoclave to the cooler lid and dripping water onto the samples. A fan mounted on the lid homogenizes distribution of the water and $CO_2$ species. This work differs from published work, where no attention was paid to (1) the choice of water concentration relative to the degree of pore saturation (DPS) in the porous body throughout the porous preform both before and during reaction (e.g., in this case, carbonation) and (2) the methodology for how the water was delivered to the porous body. Instead, prior art used arbitrary amounts of residual water during the preparation of the porous preform, failing to recognize the importance of DPS and performed subsequent treatment in an autoclave containing $CO_2$ and water vapor without identifying optimum methods of water delivery during the reaction that maintain the DPS value at ones less than 100%. Controlling the water concentration and its method of delivery into the porous preform during LTS significantly influences the carbonation kinetics. To demonstrate this and the concept of practicing the DPS concepts to find conditions of enhanced reactivity and reaction yield (high fraction reacted), samples were reacted in a container made from a micro-porous Gore-Tex™ layer. Gore-Tex™ only allows water vapor species to and from the sample in a water-saturated atmosphere where the $CO_2$ activity is fixed at a pressure of 2.36 atm and a temperature of 90° C. A pool of water sets below the sample to saturate the atmosphere and co-exist with the water vapor in the reaction throughout the duration of the reaction. Thus, the chosen water content in the porous matrix is fixed by the equilibrating water vapor and no evaporation occurs in the porous matrix. Instead, the porous matrix redistributes the water in the matrix homogenously using capillary flow with no mass loss. For 19 h reactions, [when the DPS is increased from 0 to 60 vol %.], the degree of carbonation varies from 31.3 mol % to a maximum level of 49.6 mol % beyond this value, the degree of carbonation drops to 35.6 mol % when the DPS is increased to 80% and to 3.8 mol % when the DPS is 100%. These data demonstrate that optimum amounts of liquid water in the pores speeds up the reaction yield and rate because it is essential for ionization of both carbonic acid and calcium species. However, infiltrate solution levels need to be low enough such that $CO_2$ gas can diffuse into the porous matrix by gaseous diffusion prior to dissolution and diffusion in the pore-bound in water phase to the porous matrix solid/liquid interface. This is all schematically shown in FIG. 1.

FIG. 1 g-rHLPD process Schematic: A—Dried porous $CaSiO_3$ preform; B—Partially wet $CaSiO_3$ preform; C—Final densified monolithic solid. Steps 1 to 4 represent the carbonation-densification process occurring in an individual pore: Step 1—Partially wet pore with $CO_2$; Step 2—Diffusion, dissolution and dissociation of $CO_2$; Step 3—Dissolution of $CaSiO_3$ by hydrogen ions; Step 4—Precipitation of solids. After the completion of step 4, the process takes place continuously following steps 2-4 until various kinetic factors slow down the process (e.g., thick $SiO_2$ reaction layers).

Referring back to FIG. 1, the particle size distribution is monodisperse, while in many practical cases the particle size is polydisperse and the packing of the particles could adopt a wide variety of configurations that include hierarchic structures where the packing configurations repeat at each hierarchic level or change at each level. It is also conceivable that the packing structure can have long-range order, short-range order or adopt a random level of order at every length scale, whether the length scale is small, medium or large. Alternatively, short-range order may only persist on small length scale and random on the medium and large length scales. It is also possible that particles can pack with random order scale on the short length scale but then these regions of random order could be periodically distributed on the large length scale. From these examples, it is clear that particles can pack in many different configurations and the permutations are nearly infinite. Thus, there is no purpose to define all the possibilities. Accepting that the permutations are nearly infinite, it is conceivable that the packing density can vary from a small value that could be as high as 99 vol % with ordered hierarchic packing that repeats at large, medium and small length scales. Alternatively, the packing density could be as low as 0.04 vol % when the packing structure is characteristic of an aerogel, with fractal or dendritic packing in of particle or inorganic polymer in the porous matrix.

Given that the packing density can vary over a wide range, the amount of water required to saturate the pores with 99 vol % packing is a very small amount of water while the amount required to saturate pores with 0.04 vol % is a very large amount. Thus, if the requirement is to maintain open porosity to enable a rapid reaction between the gas phase and the water and the water and the solid phase, then it is conceivable to one of ordinary skill that the optimum amount of water to enable a fast reaction will be different for each system.

While it is useful to know the amount of porosity in the system, the amount of water required is also dependent on the sizes of the pores, shapes of the pores, the tortuosity of the pores and whether any of the pores happen to be closed pores. Closed pores will not provide reactive sites for the infiltrating solution unless it is transformed to an open pore by the ensuing reaction that dissolves significant portions of the porous matrix. In addition, the above discussion assumes the porous structure is uniform. However, if the pore structure is not uniform, then the optimum concentration of the water depends on the region of heterogeneous structure being saturated with water. That being said, considering a system that has polydisperse pores, it is conceivable that an infiltrating solution can completely fill the small pores while maintaining the larger pores as partially filled. Such a situation is acceptable, provided that the open pores are within reasonable proximity of the filled ones. The exact distance of proximity cannot be precisely defined because the distance depends on temperature, pressure and composition of the gas, infiltrating solution, and porous matrix.

The above discussion demonstrates that it is impossible to specify a precise amount of water (e.g., solvent) required for optimizing the speed of the reaction because of the infinite ways that porosity can be described. Thus optimum water concentrations could be 1 vol % (DPS=20%) when the packing density is 95 vol % but could be 24 vol % (DPS=63%) when the packing density is 62 vol %. It is conceivable that methods to predict the right porosity will be possible with detailed knowledge of the porosity, pore size distribution, pore shape, tortuosity, fraction of open to closed pores in the matrix and the uniformity of the various types or pores on all length scales for the object being reacted. Thus, an important aspect of this invention is the recognition that the optimum water concentration can in fact vary over a very wide range of water concentration whenever it is important for a gas to convect or diffuse into a pore structure, dissolve and react with the solvent and subsequently react with the porous matrix.

Another important point of this invention is to recognize that there are different ways to distribute water in the porous matrix, as mentioned in this specification. For instance, if a fully saturated porous compact is saturated with water, drying could be used to create open pores. However, the pores in this structure have different DPS values as you travel from the outer surface to the inner bulk of the porous matrix. In the outer surface, pores will contain no water but as you move inward into the structure, pores are partially filled and as you move further into the structure the pores are completely filled. This structure clearly has a large gradient in DPS value and thus, the rate of reaction in this structure will vary from the outside of the structure towards the inside of the structure, assuming the gradient DPS structure remains static. However, the drying step is immediately ceased and the relative humidity is adjusted to the equilibrium value such that water loss from the porous matrix ceases, capillarity will drive the filled pores to empty into the partially filled ones and the partially filled pores will partially fill the empty pores where the entire structure will have a much more uniform distribution of water. Such a situation is one where the non-uniform system will not react as fast as the uniform one because more reaction sites are available in the uniform one due to all the pores being accessible. Thus, this example shows how the distribution of water in the porous matrix is equally important. Thus, in addition to the method of addition of the infiltrate solution components, (solvent, reactive species) the optimum concentration of water also depends on whether the porous structure is maintained as homogeneous or inhomogeneous. Thus, in any situation where the optimum concentration of water must be specified, a description of the homogeneity is important towards developing an understanding of why a certain concentration of water yields the fastest reaction rate, as well as how to reproduce that very same set of conditions each time a densification reaction is performed. It is also important to point out that in situations where distribution of the solvent or in other words, water is not distributed uniformly, processes such as annealing can be performed to redistribute the water. For water, this is best to do in a controlled humidity environment so no water evaporates from the sample. Instead, the water simply flows into open pores to balance the capillary forces of fluid between the various pores in the matrix.

Figure 2:
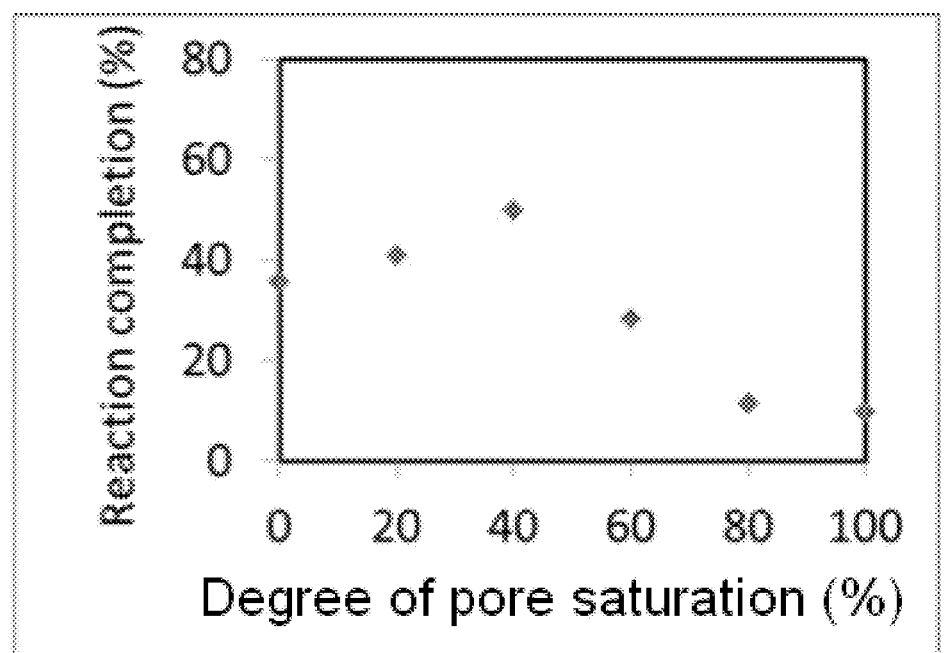
FIG. 2 represents a first example of carbonation reactions involving $CO_2$ as a gas phase and liquid water in the pore structure.
Figure 3:
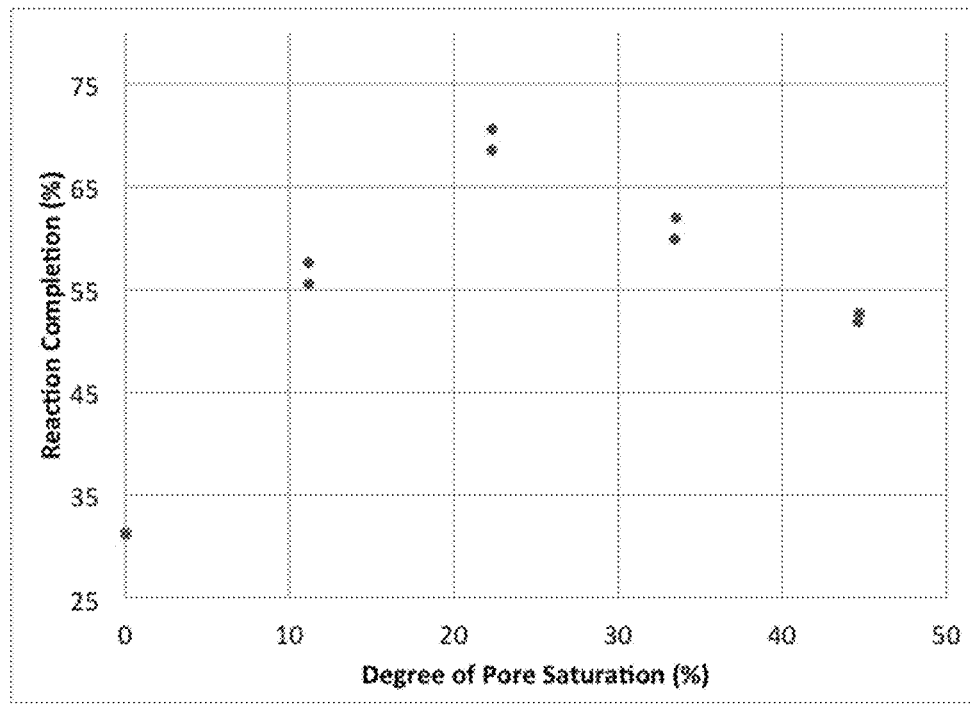
FIG. 3 represents a second example of carbonation reactions involving $CO_2$ as a gas phase and liquid water in the pore structure: Carmel Quartz Composition, 8×8×1.5" Vibratory Cast reacted, 90 C, 20 PSIG reaction.
Figure 4:
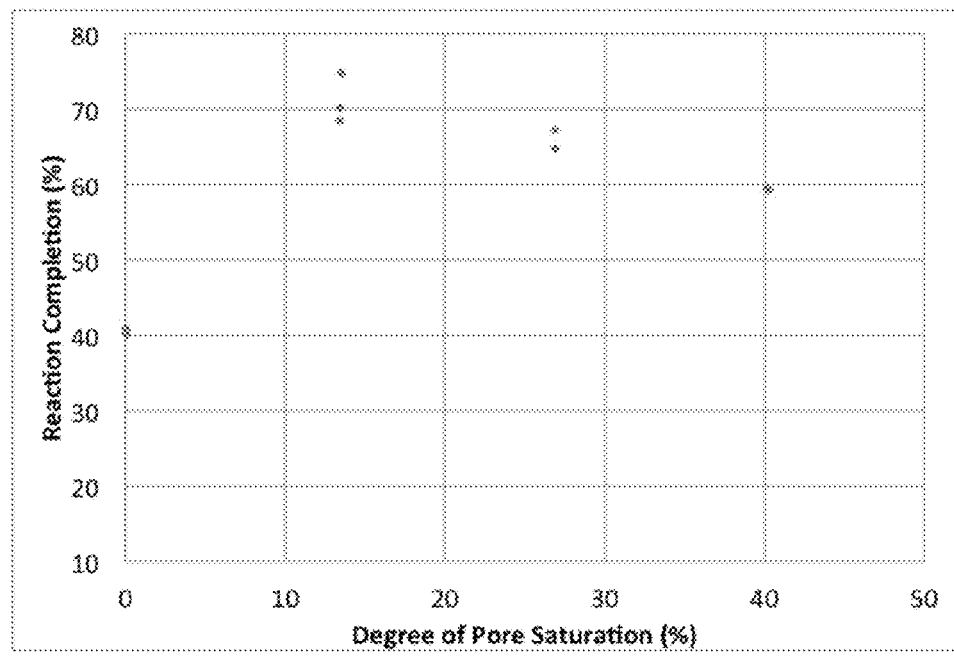
FIG. 4 represents a third example of carbonation reactions involving $CO_2$ as a gas phase and liquid water in the pore structure: 1-2-3 Composition, 8×8×2" sample size reacted at 90 C 20 PSIG, ~90% RH at ~90% Relative humidity.
Figure 5:
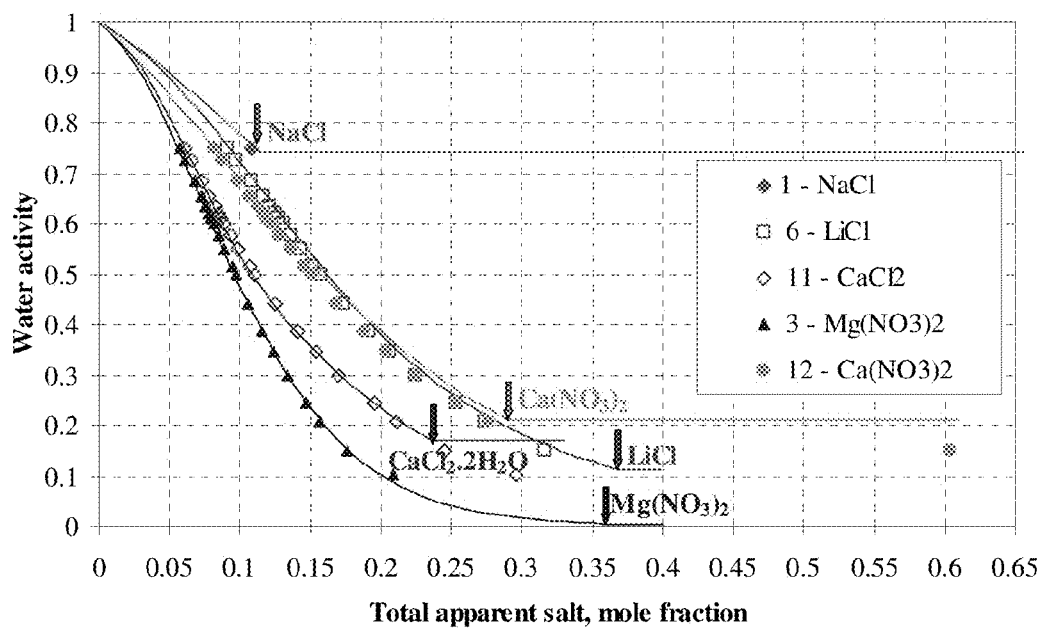
FIG. 5 represents a deliquescence curve for $Mg(NO_3)_2$.

FIGS. 2-4 are three examples of how carbonation reactions involving $CO_2$ as a gas phase and liquid water in the pore structure exhibit an optimum DPS value to maximize the degree of carbonation of a given $CaSiO_3$ binder.

The data in FIG. 2 were collected by the following method.

A suitable apparatus for g-rHLPD is an autoclave designed to enable liquid water transport to and from the porous green (unreacted) body such that open porosity is maintained either periodically or throughout the entire process. In many cases, because of the enhanced reactivity imparted by paying attention to transport of the infiltration solution, pressurization of the reaction is not required, which eliminates the need for an autoclave so that a conventional container or even a tent can be used to perform HLPS. The above capability using a simple autoclave such as a food steamer is accomplished by refluxing water vapor from the heated bottom of the autoclave to the cooler lid and dripping water onto the samples. A fan mounted on the lid homogenizes distribution of the water and $CO_2$ species.

g-rHLPD utilizes partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm). Thus, a substantial quantity of $CO_2$ must be continuously supplied to and distributed throughout the porous preform to enable significant carbonate conversion. Utilizing gas phase diffusion offers a 100-fold increase in diffusion length over that of diffusing soluble $CO_2$ an equivalent time in a liquid phase. Wollastonite porous matrices with a bulk density of ~1.88 g/cc, was prepared by wet pressing. By partially infiltrating this matrix, the reaction can proceed to a high degree of carbonation in a fixed period of time. For example, in the partially infiltrated state, 47.5±2.7 mol % conversion of $CaSiO_3$ into $CaCO_3$ and $SiO_2$ can be achieved in ~19 h at a temperature of 90° C. and a pressure of 2.36 atm. If all the same reaction conditions are maintained except that the pores are completely filled with water, a substantially lower carbonation conversion, 3.8±0.5 mol %, results.

To demonstrate this and the concept of practicing the DPS concepts to find conditions of enhanced reactivity and reaction yield (high fraction reacted), samples were reacted in a container made from a micro-porous Gore-Tex™ layer. Gore-Tex™ only allows water vapor species to and from the sample in a water-saturated atmosphere where the $CO_2$ activity is fixed at a pressure of 2.36 atm and a temperature of 90° C. A pool of water added below the sample to saturate the atmosphere and co-exist with the water vapor in the reaction throughout the duration of the reaction. Thus, the chosen water content in the porous matrix is fixed by the equilibrating water vapor and no evaporation occurs in the porous matrix. Instead, the porous matrix redistributes the water in the matrix homogenously using capillary flow with no mass loss. A porous matrix was prepared having a bulk density of 1.83-1.86 g/cc using the wet pressing method. For 19 h reactions, [when the DPS is increased from 0 to 60 vol %.], the degree of carbonation varies from 31.3 mol % to a maximum level of 49.6 mol % beyond this value, the degree of carbonation drops to 35.6 mol % when the DPS is increased to 80% and to 3.8 mol % when the DPS is 100%. These data are plotted in FIG. 2. These data demonstrate that optimum amounts of liquid water solvent at a DPS of 60 vol % in the pores maximizes the reaction yield for a 19 h process.

Additionally, FIG. 3 represents Carmel Quartz Composition. 8×8×1.5" Vibratory Cast reacted. 90 C, 20 PSIG reaction, and FIG. 4 represents 1-2-3 Composition. 8×8×2" sample size reacted at 90 C 20 PSIG, ~90% RH at ~90% relative humidity. In each of these graphs, the systems differed from one another in that the sample size, shape, reactive wollastonite, reaction time, reaction temperature, relative humidity and reactor design all differed, yet each system was consistent within itself to show an optimum concentration where mass transport and reaction rate was optimized to maximize the amount of carbonate formed. The optimum DPS value varied from 20 to 60 vol %. In these cases, all the porous matrices have a relative density of about 60%. Thus, if a porous matrix was significantly more or less dense, this range of value can be even greater, assuming the pore size and tortuosity is the same. If pore size and tortuosity were different, the value may vary over an even wider range. Thus, a key step in optimizing the degree of carbonation and carbonation rate is to recognize that there is an optimum DPS value for any given method of water delivery. Knowing this value will enable the determination of the ideal conditions for minimizing the amount of reaction time as well as crystallize more binding phase by the hydrothermal liquid phase sintering reaction.

A further improvement of the invention can be made when gas species are mechanically convected by applying a pressure gradient across the porous matrix. If the gas is a reactive species, pores filled with solvent fluid can flow out of the pores leaving behind a film of solvent on the pores that can absorb the reactive species gas. Alternatively, partially filled pores will allow gas to flow through the pores as the solvent absorbs a portion of the gas flowing through.

The preferred approach should utilize low temperatures and low pressures to enable low cost processes to be developed. Thus, processes that retain a fraction of solvent in the pores to facilitate gaseous diffusion of reactive species are preferred over those that utilize quiescent fluids for reactions where a large fraction of product is desired. If gaseous precursors are not available, then methods that mechanically convect the infiltration fluid rapidly through the porous matrix are a viable alternative approach.

There are many apparatus designs that can effectively transport reactant and solvent species to the pores. Some of these designs involve conventional reactor equipment such as filter presses, spray chambers, autoclaves and steamers.

NON-LIMITING WORKING EXAMPLES

Example 1

1) External, Transport by Means of Water Vapor 1.1 Mixing

Eleven kg and one hundred and seventeen grams NYAD 400, 20.39 kg of mason sand, 16.76 kg of ¼" aggregate, and 16.76 kg of #67 aggregate were gathered in separate buckets. Then, batch water was prepared by premixing 4.9 kg deionized water, 55 ml Glenium, and 8 g welan gum. #67 and ¼" aggregate were loaded into the Marshall tow concrete mixer and roughly ¼ of the batch water solution was poured on the aggregate. The mixer was started and run at full speed for 1 minute. With mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and run at full speed for an additional 3 minutes. The mixer was stopped and mix poured into 5 gallon buckets.

1.2 Casting

One feet by 1' by 6" molds were lubricated by spraying WD-40 on a rag and wiping the inside surface of a clean mold down. Using the table scale, the weight of the mold was recorded. The lubricated mold was placed on the Vibco vibration table. The mix was removed from the bucket with a trowel, scoop, or by hand and the mold filled approximately ¼ of the way. Then the mold was vibrated on 60% power for approximately 1 minute or until the mix had formed to the mold. The process was repeated until the mold was full to the brim. A final weight on the samples was recorded before storing in an area to air-dry over-night 1.3 Drying Air-dry samples overnight. After 24 hr of air-drying, samples placed in an oven at 90° C. After 24 hr at 90° C. samples removed and de-molded. Samples were put back in the oven for an additional 48 hr to fully dry before reaction.

1.4 Reacting

The autoclave used for curing (reacting) the samples is a stainless steel, horizontal, indirect steam unit with a radius of 7 and a length of 12 feet. Samples were loaded into the pre-heated autoclave at 90° C. After the autoclave door was closed, it was evacuated down to −14 psig in 15 minutes. The autoclave was back filled with heated $CO_2$ gas and steam at 147.5° C. to provide additional heat to the samples and to account for the heat loss occurred during sample loading and expansion of the gasses. Once the pressure in the autoclave reached 0 psig, the fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were cured for 19 hours.

The reacted samples were dried in a dying oven at 90° C. until there was no further weight loss. The extent of the reaction was calculated based on the weight gain during the reaction. The average extent of reaction was 35%.

Example 2

External, Partial Wetting 2.1 Mixing

Three hundred grams and six tenths of a gram of NYAD400 and 601.1 g ASTM sand were gathered by weighing materials in separate plastic containers. A beaker was filled with 89.46 g of Deionized water (DI). DI water was poured into the Hobart NSU mixers mixing bowl. The NYAD400 was dumped directly on the water in the mixing bowl. The mixing bowl was loaded into the mixer and the mixing blade inserted. Then NYAD440 and water was mixed for 30 seconds on low speed (#1 setting). After 30 seconds ASTM sand was poured into the mixer bowl while the mixer was running over a period of 30 seconds. The mixer was stopped and switched to speed #2. The batch is mixed for 30 seconds. The mixer was stopped and the mixing bowl was scraped down with a rubber spatula to free any stuck material from the side of the bowl. Glenium7500 was added with a pipette directly on the mix. The mixing continued at speed #2 for one minute. The mixing bowl was removed from the mixer and taken to the casting station.

2.2 Casting

A fifty millimeter cube mold was lubricated by spraying WD-40 on a rag and wiping the inside surface of a clean mold down. The lubricated mold was placed on the Vibco vibration table. The mix was removed from the mixing bowl by hand and the 3 cubes that make up one 50 mm cube mold were filled approximately one half of the way. The cube mold was vibrated at 60% power for approximately 2 minutes or until the mix had formed to the mold and the surface appeared smooth. The process was repeated until mold was slightly overfilled. The sharp edge of a trowel was used in a sawing motion to level the cube-shaped casting slurry with the mold edge.

2.3 Reacting

The samples, 2"×2" cubes, were first completely dried after casting in a drying oven at 110° C. After drying they were allowed to cool down to room temperature. Once they were cooled, the samples were wet with de-chlorinated water evenly from all 6 sides. The samples were loaded in to the pre-heated autoclave at 60° C. The autoclave used for curing the samples is a stainless steel, horizontal unit with a radius of 12 inches and a length of 20 inches. After the autoclave door was closed, it was evacuated down to −13 psig in 5 minutes. The autoclave was equilibrated with the water tank to allow water vapor into the autoclave. Then $CO_2$ gas was added to reach a total of 0 psig. Once the pressure in the autoclave reached 0 psig, the fan of the autoclave was started at 3600 RPM. The autoclave temperature was set to 60° C. and water at 63° C. was circulated at the bottom of the autoclave to keep the unit saturated with water vapor. The samples were cured with the system in this state for 20 hrs.

The reacted samples were dried in a dying oven at 110° C. until there was no further weight loss. The extent of the reaction was calculated based on the weight gain during the reaction. The average extent of reaction was 57%.

2.4 Testing

The dimensions of the mortar cubes are 2". The load was applied to the specimen faces that were in contact with the true plane surfaces of the mold. Gilson MC-300PR was used as mechanical tester. The load rate for testing was adjusted to the range of 5-100 psi/s. The compressive strength was 10338 psi.

Example 3

3) External, by Means of Spraying in the Autoclave 3.1 Mixing

Eighty nine kg and six hundred ten grams of Nycor100 Wollastonite, NYCO Minerals Willsboro N.Y., 120.4 kg of Dolomitic Limestone DF 1000, Specialty Minerals, Canaan, Conn., 64.87 kg of NYAD400 Wollastonite, NYCO Minerals Willsboro N.Y., and 4.18 kg of Multifex-MM precipitated calcium carbonate, Specialty Minerals, Canaan, Conn., were added into Lancaster K4 mixer. After all solid components have been added to the mixer, the lid was closed, power turned on, and the mixer pan, plow, and rotor was started. Rotor was set in the forward direction at 1700 rpm and blended for 2 minutes. Half of the premixed deionized water (25.66 kg) and acumer 9400, Rohm Haas (259 g) solution was loaded into the water tank at the bottom of the mixing platform. Once 2 min dry mix was completed, the rotor motor was stopped and switched to reverse direction. The rotor motor was restarted and when 1700 rpm was reached, the acumer solution was added into the mix. After waiting for a minute, the process was repeated to add the rest of the acumer solution. The mixer was run for 3.5 minutes and the granules were transferred into a container.

3.2 Casting

The aluminum honeycomb mold with an inner dimensions of 5'×2'×1" was lubricated by wiping with WD-40. A piece of Fibatape Crackstop mesh with dimensions of 5'×2' was cut. The lubricated mold was placed on the Vibco vibration table and tighten down with clamps. The mold was filled with the granules halfway and vibrated at maximum frequency until slurry has formed which is approximately 5 to 10 minutes. The second layer of granules were added into the mold and vibrated again. After the casting is fully formed, the precut mesh was placed over the surface of the slurry and rubbed down into the surface. The samples were fully dried in a pre-heated oven at 90° C. and the dry weight of the samples was measured.

3.3 Reacting

The autoclave used for curing the samples is a stainless steel, horizontal, indirect steam unit with a radius of 7 and a length of 12 feet. Samples were loaded in to the pre-heated autoclave at 90° C. After the autoclave door was closed, it was evacuated down to −14 psig in 15 minutes. The autoclave was back filled with heated $CO_2$ gas and steam at 147.5° C. to provide additional heat to the samples and to account for the heat loss occurred during sample loading and expansion of the gasses. Once the pressure in the autoclave reached 0 psig, the fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were sprayed with hot water at 90° C., at 100 psi with a rate of 0.036 gallons per minute with 2 spray nozzles per sample with a droplet size under 50 microns for ½ hours. The $CO_2$ set point was reduced to 10 psig. The samples were cured for 12.5 hours. The reacted samples were dried in a dying oven at 90° C. until there was no further weight loss. The extent of the reaction was calculated based on the weight gain during the reaction. The average extent of reaction was 50%.

Example 4

4) External Partial Wetting with a Water Solution Containing Surfactant 4.1 Mixing Fifty kg and six hundred fifty grams of NYCO 400 Wollastonite, NYCO Minerals Willsboro N.Y., 86.95 kg of Carmel quartz, crushed quartz, Kafka Granite, 64.19 kg of mason sand, North Brunswick Construction Materials, NJ, were added into Lancaster K4 mixer.

After all solid components have been added to the mixer, the lid was closed, power turned on, and the mixer pan, plow, and rotor was started. Rotor was set in the forward direction at 1700 rpm and blended for 2 minutes. Half of the premixed deionized water (25.66 kg) and acumer 9400, Rohm Haas (259 g) and 30 g Walen gum solution was loaded into the water tank at the bottom of the mixing platform. Once 2 min dry mix was completed, the rotor motor was stopped and switched to reverse direction. The rotor motor was restarted and when 1700 rpm was reached, the acumer solution was added into the mix. After waiting for a minute, the process was repeated to add the rest of the acumer solution. The mixer was run for 3.5 minutes and the granules were transferred into a container.

4.2 Casting

The Teflon coated mold with an inner dimensions of 8"×8"×1" was lubricated by wiping with WD-40. The lubricated mold was placed on the Vibco vibration table and tightened down with clamps. The mold was filled with the granules halfway and vibrated at maximum frequency until slurry has formed which is approximately 5 to 10 minutes. The second layer of granules were added into the mold until the sample thickness reached ¾" and vibrated again. The samples were fully dried in a pre-heated oven at 90° C. and the dry weight of the samples was measured.

4.3 Reacting

The samples were completely dried prior to the reaction. After drying they were allowed to cool down to room temperature. Once they were cooled, the first set of samples were wetted with 1.5 wt % Akzo Nobel Ethylan 1008 SA solution, and the second set was wetted with 1.5 wt % Akzo Nobel TD100 solution. The solution to sample ratio was 4.75 wt %. The samples were loaded in to the pre-heated autoclave at 90° C. The autoclave used for curing the samples is a stainless steel, horizontal unit with a radius of 12 inches and a length of 20 inches. After the autoclave door was closed, it was evacuated down to −13 psig in 5 minutes. The autoclave was equilibrated with the water tank to allow water vapor into the autoclave. Then $CO_2$ gas was added to reach a total of 0 psig. Once the pressure in the autoclave reached 0 psig, the fan of the autoclave was started at 4900 RPM. The autoclave temperature was set to 90° C. and water at 95° C. was circulated at the bottom of the autoclave to keep the unit saturated with water vapor. The samples were cured with the system in this state for 19 hrs.

The reacted samples were dried in a dying oven at 110° C. until there was no further weight loss. The extent of the reaction was calculated based on the weight gain during the reaction. The extent of reaction for the first set of samples was 75% and for the second set was 72%.

Example 5

5) Internal, Partial Drying 5.1 Mixing

Eleven kg and one hundred and seventeen grams NYAD 400, 20.39 kg of mason sand, 16.76 kg of ¼" aggregate, and 16.76 kg of #67 aggregate were gathered in separate buckets. Then batch water was prepared by premixing 4.9 kg deionized water, 55 ml Glenium, and 8 g welan gum #67 and ¼" aggregate were loaded into the Marshalltow concrete mixer and roughly ¼ of the batch water solution was poured on the aggregate. The mixer was started and run at full speed for 1 minute. With mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and ran at full speed for an additional 3 minutes. The mixer was stopped and mix poured into 5 gallon buckets.

5.2 Casting

One feet by 1' by 6" were lubricated by spraying WD-40 on a rag and wiping the inside surface of a clean mold down. Using the table scale, the weight of the mold was recorded. The lubricated mold was placed on the Vibco vibration table. The mix was removed from the bucket with a trowel, scoop, or by hand and the mold filled approximately ¼ of the way. Then the mold was vibrated on 60% power for approximately 1 minute or until the mix had formed to the mold. The process was repeated until the mold was full to the brim. A final weight on the samples was recorded before storing in an area to air-dry over-night 5.3 Drying Air-dry samples overnight. After 24 hr of air-drying, samples placed in an oven at 90° C. After 24 hr at 90° C. samples removed and de-molded. Samples put back in the oven until the samples were dried down to 2.2 wt % residual water.

5.4 Reacting

The autoclave used for curing the samples is a stainless steel, horizontal, indirect steam unit with a radius of 7 and a length of 12 feet. Samples were loaded in to the pre-heated autoclave at 90° C. After the autoclave door was closed the autoclave was back filled with heated $CO_2$ gas and steam at 147.5° C. to provide additional heat to the samples and to account for the heat loss occurred during sample loading and expansion of the gasses. The fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were cured for 19 hours.

The reacted samples were dried in a dying oven at 90° C. until there was no further weight loss. The extent of the reaction was calculated based on the weight gain during the reaction. The average extent of reaction was 53%.

Example 6

6) Internal, Wet Pressing 6.1 Mixing

One kg and eight hundred and seventy one grams of NYAD 400, 7.412 kg sand, and 2.470 kg ¼" aggregate was gathered in separate containers. All of the dry materials were loaded into the pan of the K-lab mixer. The mixer head was lowered and then turned on for 2 minutes with a 20 rpm mixing pan speed. After two minutes, 816 g of tap water was added to the mix and the mixer was run for 4 additional minutes.

6.2 Casting

The paver mix was loaded into six "cavities" that were overfilled with material. A plastic scooper was used to lift and dump the material from the mixer pan into the cavities. After the mix was poured into the cavities the heads were lowered and pressed down on the material until it could not go any further. Next, the vibration was turned on for 8 seconds.

6.3 Reacting

The autoclave used for curing the samples is a stainless steel, horizontal, indirect steam unit with a radius of 7 and a length of 12 feet. Pavers were loaded into the pre-heated autoclave at 60° C. immediately after forming. After the autoclave door was closed, it was purged with preheated $CO_2$ at 75° C. for 5 minutes with bottom and top bleed ports open to the atmosphere in the vessel. The valves are closed and $CO_2$ pressure is regulated 0.5 PSIG. Preheated water at 75° C. is then recirculated across the bottom of the reactor to allow for water vapor pressure to build in the system to sustain a high relative humidity in the system. As water vapor pressure builds the vessel is purged several times to maintain pressure at 0.5 PSIG. Once thermal equilibrium at 60° C. has been reached and the pressure has been stabilized and regulated to 0.5 PSIG by only regulating $CO_2$ partial pressure, the gas concentration is approximately 83.7% $CO_2$ and 16.3% $H_2O$ vapor. Samples are held under these conditions for 19 hours until they are removed and dried in an exhausting industrial oven at 100° C. and 0.7% RH for 2 days. The extent of reaction was calculated based on weight gain as compared to the initial dry powders that were mixed, and the average of reaction for these procedures are 58%.

6.4 Testing

Gilson MC-300PR was used as mechanical tester. The load rate for testing was adjusted to the range of 5-100 psi/s. The compressive strength was 10174 psi.

Example 7

7) Casting with a Hygroscopic Solution 7.1 Mixing

Eleven kg and one hundred and seventeen grams NYAD 400, 20.39 kg of mason sand, 16.76 kg of ¼" aggregate, and 16.76 kg of #67 aggregate were gathered in separate buckets. Then batch water was prepared by premixing 4.9 kg deionized water, 55 ml Glenium, and 8 g welan gum. #67 and ¼" aggregate were loaded into the Marshalltow concrete mixer and roughly ¼ of the batch water solution was poured on the aggregate. The mixer was started and run at full speed for 1 minute. With the mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and ran at full speed for an additional 3 minutes. The mixer was stopped and mix poured into 5 gallon buckets.

7.2 Casting

Eight inches by 8" by 1" molds were lubricated by spraying WD-40 on a rag and wiping the inside surface of a clean mold down. Using the table scale, the weight of the mold was recorded. The lubricated mold was placed on the Vibco vibration table. The mix was removed from the bucket with a trowel, scoop, or by hand and the mold filled approximately ¼ of the way. Then the mold was vibrated on 60% power for approximately 1 minute or until the mix had formed to the mold. The process was repeated until the mold was filled up to ¾". A final weight on the samples was recorded before storing in an area to air-dry over-night.

7.3 Drying

Air-dry samples overnight. After 24 hours of air-drying, samples placed in an oven at 90° C. After 24 hours at 90° C. samples removed and de-molded. Samples put back in the oven for an additional 48 hours to fully dry before reaction.

7.4 Reacting

Samples are cast separately with 15 wt % of Sodium Carbonate and 15 wt % Proplyene Glycol. Sodium carbonate is a hygroscopic salt used to retain water, and Propylene Glycol has a low surface tension and low vapor pressure to help retain water and keep water distributed uniformly in the sample. Samples are dried overnight at 90° C. Samples are rewet from the top surface with the addition of 2% of water of the total sample solids mass. The autoclave used for curing the samples is a stainless steel, horizontal, indirect steam unit with a radius of 7 ft and a length of 12 ft. Samples were loaded in the pre-heated autoclave at 90° C. After the autoclave door was closed, it was evacuated down to −13 psig in 15 minutes. The autoclave was back filled with heated $CO_2$ gas and steam at 120° C. to provide additional heat to the samples and to account for the heat loss occurred during sample loading and expansion of the gasses. Once, the pressure in the autoclave reached 0 psig, the fan of the autoclave was started at 4900 RPM. The autoclave pressure was increased to 20 psig by filling with heated $CO_2$ gas only. The autoclave temperature was set to 90° C. and hot water at 95° C. was circulated at the bottom of the autoclave to keep the unit with saturated water vapor. The samples were held in this condition for a total of 19 hours. The reacted samples were dried in dying oven at 90° C. until there is no further weight loss. The extent of the reaction was calculated based on the weight gain during the reaction. The average extend of reaction was 45% for sodium carbonate samples and 75% for propylene glycol.

7.5 Testing

A representative test piece from the sample was cut with dimensions equal to the thickness of the sample. The sample was dried and dimensions were measured. The tests were done by using an Instron 4206 mechanical tester. The speed of testing head was 0.5 mm/min. The compressive stress at maximum compressive load was recorded. The compressive strengths were 5676 and 3019 psi respectively.

Example 8

8) Multiple Wetting and Drying Cycles 8.1 Mixing

Fifty kg and six hundred fifty grams of NYCO 400 Wollastonite, NYCO Minerals Willsboro N.Y., 86.95 kg of Carmel quartz, crushed quartz, Kafka Granite, 64.19 kg of mason sand, North Brunswick Construction Materials, NJ, were added into Lancaster K4 mixer.

After all solid components have been added to the mixer, the lid was closed, power turned on, and the mixer pan, plow, and rotor was started. Rotor was set in the forward direction at 1700 rpm and blended for 2 minutes. Half of the premixed deionized water (25.66 kg) and acumer 9400, Rohm Haas (259 g) and 30 g Walen gum solution was loaded into the water tank at the bottom of the mixing platform. Once 2 min dry mix was completed, the rotor motor was stopped and switched to reverse direction. The rotor motor was restarted and when 1700 rpm was reached, the acumer solution was added into the mix. After waiting for a minute, the process was repeated to add the rest of the acumer solution. The mixer was run for 3.5 minutes and the granules were transferred into a container.

8.2 Casting

The aluminum honeycomb mold with an inner dimensions of 5'×2'×1" was lubricated by wiping with WD-40. A piece of Fibatape Crackstop mesh with dimensions of 5'×2' was cut. The lubricated mold was placed on the Vibco vibration table and tighten down with clamps. The mold was filled with the granules halfway and vibrated at maximum frequency until slurry has formed which is approximately 5 to 10 minutes. The second layer of granules were added into the mold and vibrated again. After the casting is fully formed, the precut mesh was placed over the surface of the slurry and rubbed down into the surface. The samples were fully dried in a pre-heated oven at 90° C. and the dry weight of the samples was measured.

8.3 Reacting

The autoclave used for curing the samples is a stainless steel, horizontal, indirect steam unit with a radius of 7 feet and a length of 12 feet. Samples were loaded in to the pre-heated autoclave at 90° C. After the autoclave door was closed, it was evacuated down to −14 psig in 15 minutes. The autoclave was back filled with heated $CO_2$ gas and steam at 147.5° C. to provide additional heat to the samples and to account for the heat loss occurred during sample loading and expansion of the gasses. Once the pressure in the autoclave reached 0 psig, the fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were sprayed with hot water at 90° C., at 100 psi with a rate of 0.036 gallons per minute with 2 spray nozzles per sample with a droplet size under 50 microns for 2 to 3 hours. The $CO_2$ set point was reduced to 10 psig and the chiller was turned on to increase the rate of water removal from the samples. The samples were cured while drying for 20 hours. Then the wetting process was repeated. Steam at 147.5° C. was added to the system again and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were sprayed with hot water again for 2 to 3 hours. The $CO_2$ set point was reduced to 10 psig and the chiller was turned on to increase the rate of water removal from the samples. The samples were cured while drying for another 20 hours.

The reacted samples were dried in a drying oven at 90° C. until there was no further weight loss. The extent of the reaction was calculated based on the weight gain during the reaction. The average extent of reaction was 83%.

8.4 Testing

A representative test piece from the sample was cut with dimensions equal to the thickness of the sample. The sample was dried and dimensions were measured. The tests were done by using an Instron 4206 mechanical tester. The speed of testing head was 0.5 mm/min. The compressive stress at maximum compressive load was recorded. The compressive strength was 9500 psi.

Example 9

9) Single Wetting and Drying Cycle 9.1 Mixing

Eighty nine kg and six hundred ten grams of Nycor100 Wollastonite, NYCO Minerals Willsboro N.Y., 120.4 kg of Dolomitic Limestone DF 1000, Specialty Minerals, Canaan, Conn., 64.87 kg of NYAD400 Wollastonite, NYCO Minerals Willsboro N.Y., and 4.18 kg of Multifex-MM precipitated calcium carbonate, Specialty Minerals, Canaan, Conn., were added into Lancaster K4 mixer. After all solid components have been added to the mixer, the lid was closed, power turned on, and the mixer pan, plow, and rotor was started. Rotor was set in the forward direction at 1700 rpm and blended for 2 minutes. Half of the premixed deionized water (25.66 kg) and acumer 9400, Rohm Haas (259 g) solution was loaded into the water tank at the bottom of the mixing platform. Once 2 min dry mix was completed, the rotor motor was stopped and switched to reverse direction. The rotor motor was restarted and when 1700 rpm was reached, the acumer solution was added into the mix. After waiting for a minute, the process was repeated to add the rest of the acumer solution. The mixer was run for 3.5 minutes and the granules were transferred into a container.

9.2 Casting Procedure:

The aluminum honeycomb mold with an inner dimensions of 5'×2'×1" was lubricated by wiping with WD-40. A piece of Fibatape Crackstop mesh with dimensions of 5'×2' was cut. The lubricated mold was placed on the Vibco vibration table and tighten down with clamps. The mold was filled with the granules halfway and vibrated at maximum frequency until slurry has formed which is approximately 5 to 10 minutes. The second layer of granules were added into the mold and vibrated again. After the casting is fully formed, the precut mesh was placed over the surface of the slurry and rubbed down into the surface. The samples were fully dried in a pre-heated oven at 90° C. and the dry weight of the samples was measured.

9.3 Reacting

The autoclave used for curing the samples is a stainless steel, horizontal, indirect steam unit with a radius of 7 feet and a length of 12 feet. Samples were loaded in to the pre-heated autoclave at 90° C. After the autoclave door was closed, it was evacuated down to −14 psig in 15 minutes. The autoclave was back filled with heated $CO_2$ gas and steam at 147.5° C. to provide additional heat to the samples and to account for the heat loss occurred during sample loading and expansion of the gasses. Once the pressure in the autoclave reached 0 psig, the fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were sprayed with hot water at 90° C., at 100 psi with a rate of 0.036 gallons per minute with 2 spray nozzles per sample with a droplet size under 50 microns for 2 to 3 hours. The $CO_2$ set point was reduced to 10 psig and the chiller was turned on to increase the rate of water removal from the samples. The samples were cured while drying for 16 hours.

The reacted samples were dried in a dying oven at 90° C. until there was no further weight loss. The extent of the reaction was calculated based on the weight gain during the reaction. The average extent of reaction was 69%.

9.4 Testing

A representative test piece from the sample was cut with dimensions equal to the thickness of the sample. The sample was dried and dimensions were measured. The tests were done by using an Instron 4206 mechanical tester. The speed of testing head was 0.5 mm/min. The compressive stress at maximum compressive load was recorded. The compressive strength was 13900 psi.

Example 10

10) Water Vapor Via Internal Channel

The sample used was an 18 inch long, 4 inch wide and 4 inch tall rectangular prism with a 2 inch diameter hole at the center along its length. $CO_2$ gas at 60° C. with saturated water vapor was purged thru the 2 inch diameter hole for 20 h with a flow rate of 6 L/min.

The sample was dried at 90° C. until there was no further weight loss. The extent of the reaction was calculated based on the weight gain during the reaction. The extent of reaction was 40%.

Example 11

11) Delta P, Drying from Bottom while Pressurizing from Top 11.1 Mixing

Sixteen kg of NYAD 400, 29.086 kg of mason sand, 29.086 kg of ¼" aggregate were gathered in separate buckets. Then batch water was prepared by premixing 5.77 kg deionized water, 58 ml Glenium, and 8 g welan gum. Quarter inch aggregates were loaded into the Marshalltow concrete mixer and roughly ¼ of the batch water solution was poured on the aggregate. The mixer was started and run at full speed for 1 minute. With mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and ran at full speed for an additional 3 minutes. The mixer was stopped and mix poured into 5 gallon buckets.

11.2 Casting and Reacting

Sample 305, 6 particle composition, is cast 1" tall into an 18" diameter 304 stainless steel pipe on top of a rubber gasket with a 10" circular diameter that lies atop a permeable reinforced sheet with a 100 mesh stainless steel screen. Therefore, the center 10" bottom of the sample is completely open to atmosphere. The pipe is gasket sealable from the top with another stainless steel plate. The pipe is wrapped with heating tape and allowed to heat the shell of the vessel until the gas temperature above the sample is stable at 68° C. A dry $CO_2$ gas stream is pressurized to the top of the sample at 3.5 PSIG+/−1 PSIG creating a pressure differential from top to the bottom of the sample. Flow through or around the sample is almost immediate when pressurized by detecting the outlet flow after beginning pressurizing the top of the sample. After 16 hours of reaction and dry $CO_2$ flow through or around the sample, the sample was removed. The sample was dried in an exhausting industrial electric oven with at 100° C. and a relative humidity of 0.7% for 4 days, removing 98 grams of remnant water from the sample. The sample gained 430 g of mass due to carbonation, accounting for a degree of carbonation of 49.5%.

Example 12

12) Delta P, Pressurizing from Top 12.1 Mixing

Sixteen kg of NYAD 400, 29.086 kg of mason sand, 29.086 kg of ¼" aggregate were gathered in separate buckets. Then batch water was prepared by premixing 5.77 kg deionized water, 58 ml Glenium, and 8 g welan gum. Quarter inch aggregates were loaded into the Marshalltow concrete mixer and roughly ¼ of the batch water solution was poured on the aggregate. The mixer was started and run at full speed for 1 minute. With mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and run at full speed for an additional 3 minutes. The mixer was stopped and mix poured into 5 gallon buckets.

12.2 Casting and Reacting

Sample 292-Pushpull is cast into an 18" diameter 304 stainless steel pipe on top of a rubber gasket with a 10" circular diameter that lies atop a permeable reinforced sheet with a 100 mesh stainless steel screen. Therefore, the center 10" bottom of the sample is unsealed and is exposed to a sealed chamber below the vessel that is connected to atmosphere via a 3/16" orifice that could restrict flow and retain humidity. The pipe is gasket sealable from the top with another stainless steel plate. The pipe is wrapped with heating tape and allowed to heat the shell of the vessel until the gas temperature above the sample is stable at 60° C. A dry $CO_2$ gas stream is pressurized to the top of the sample at 12 PSIG+/−3 PSIG creating a pressure differential from top to the bottom of the sample. After 2 days under this condition an outlet flow of gas is detectable from a ¼" port beneath the permeable screen that is below the sample. After 11 total days of reaction and dry $CO_2$ flow through or around the sample, the sample was removed and the average temperature of the solid using an infrared gun was 68° C. The sample was dried in an exhausting industrial electric oven with at 100° C. and a relative humidity of 0.7% for 8 days, removing 2.17 kg of remnant water from the sample. The sample gained 4.556 kg of mass due to carbonation, accounting for a degree of carbonation of 88%.

12.3 Testing

The cylinder dimensions were 4" diameter and 8" long. The cylinders for testing were prepared by either grinding both ends parallel, or trimming the top part if necessary. The sample was capped with un-bonded caps, using a 50-70 duro neoprene pad. In the case of samples that have been ground on both ends, test samples with no cap. Samples were tested by using a Gilson MC-300PR mechanical tester at a load rate of 28-42 psi/s. The compressive strength was 9936 psi.

General Experimental Details for the Experiments Collecting the Data of FIG. 2:

Experimental Procedure and Results

Raw Materials

All experiments were performed using commercially available as-is $CaSiO_3$ powder (NYAD 400, NYCO Minerals Inc., Willsboro, N.Y.). Table 2 shows the particle size distribution data measured by Fraunhofer Diffraction (Mastersizer 2000, Malvern Instruments, Ltd., Westborough, Mass.) and the apparent powder density measured by He-pycnometry (AccuPyc 1330, Micromeritics Instrument Corporation, Norcross, Ga.). For particle size measurements, a few drops of ~1 wt % suspension of the powder were added into the Mastersizer. The refractive index used for wollastonite powders was 1.63 (51). For apparent powder density measurements, ~4.5 g powder dried at 100° C. for ~30 min were used in 3.5 $cm^3$ metal cups. For each characterization, a set of three experiments was performed. Table 3 summarizes chemical composition of $CaSiO_3$ powder analyzed by X-Ray Fluorescence (XRF) analysis (Wavelength Dispersive X-ray Fluorescence Spectrometer, Bruker AXS Inc., Madison, Wis.). An individual sample for XRF analysis was prepared by pressing powders mixed with 20% paraffin (Sigma-Aldrich Co. LLC, Milwaukee, Wis.) into ~37 mm compacts by applying a compressive stress of ~274 MPa for 5 min. All the powder characterization data obtained in this study were consistent with those given by NYCO Minerals Inc.

TABLE 2

Particle size and density data of the used $CaSiO_3$ powder.

| Raw Material | Particle size | | | Density (g/cm³) |
|---|---|---|---|---|
| | $d_{10}$ (μm) | $d_{50}$ (μm) | $d_{90}$ (μm) | |
| NYAD 400 | 2.1 | 9.2 | 28.6 | 2.89 |

TABLE 3

Chemical composition of $CaSiO_3$ powder (wt %) by XRF

| Raw Material | $SiO_2$ | CaO | $TiO_2$ | MnO | $Fe_2O_3$ | SrO | $Al_2O_3$ |
|---|---|---|---|---|---|---|---|
| NYAD 400 | 46.75 | 51.68 | 0.06 | 0.19 | 1.03 | 0.01 | 0.27 |

Sample Fabrication

Green Body Forming

A set of 20 samples was prepared in this work. Green bodies (preforms) were prepared by wet pressing $CaSiO_3$ powder in a stainless steel die having a circular inner die diameter of ~29 mm (Carver laboratory press Model 2698, Fred S. Carver, Inc., Menomonee Falls, Wis.). The steel die was first lubricated with a spray lubricant (WD-40, WD-40 Company, San Diego, Calif.) and then placed on a vibrating table (Syntron J-la, FMC Technologies, Homer City, Pa.). $CaSiO_3$ powder (~8.5 g) was added in the steel die, thereafter deionized water (Milli-Q Biocel system, EMDMillipore, Billerica, Mass.) was sprayed in the mold from a plastic bottle until water saturated the powders. The entire mold was vibrated by using the medium setting of the controller in vibrating table for ~5 s. This process was repeated for three cycles. These wet powders were then pressed at a compressive stress of ~90 MPa with a hold time of ~10 s, and then the compressive stress was gradually removed during unloading (this cycle was repeated twice). The excess water in the structure escaped during cold pressing between the inner punch and outer die wall. Typically a pressed sample retained ~15 wt % water. The pressed green sample was demolded from the steel mold. The pressed samples were then dried in a convection drying oven (Lindberg Blue M, Thermo Fisher Scientific Inc., Dubuque, Iowa) at 100° C. for ~12 h. The mass ($m_{dry}$) (Table 4) and dimensions (axial and diameter) after the drying were recorded. In the text, the dimensional change (axial and diametric) is reported as a percentage (Table 4) with a positive value indicating shrinkage.

g-rHLPD Reaction

The dried samples were reacted via g-rHLPDat 90° C., 1.36 atm ($CO_2$ gauge pressure) for 19 h in a customized autoclave sterilizer (Model 75X, All American Electric Sterilizer, Manitowoc, Wis.). First, 4 L of deionized water was added into the autoclave (filled water occupied a height of ~52 mm in the autoclave) and then a stainless steel stage (height ~72 mm) was placed in the reactor. The samples were placed on the stage such that there was no direct contact between the water and samples. Approximately 230 g of dry ice (Dry Ice Corp., Old Tappan, N.J.) was added in the reactor to flush out the air from the reactor. When the $CO_2$ gas blanketed the reaction chamber after 2-3 min, the reactor chamber was closed. After closing the lid and sealing the steamer, the autoclave was purged 3 times with $CO_2$ (Bone dry grade, Airgas Inc., Piscataway, N.J.) then the heating was started. Reaction time was counted when the gauge pressure rose to 1.36 atm and the temperature reached 90° C. After ~19 h reaction, the samples were fully dried in a convection drying oven at 100° C. for ~12 h. The final weight ($m_{HLPS}$) (Table 3) and the dimensions were recorded for each sample. Table 4 shows the percent dimensional change of the sample after drying and g-rHLPD process, respectively.

For GoreTex™ experiments, the preforms with various degree of pore saturation (0, 20, 40, 60, 80, 100 vol %) were first prepared by dipping water on the samples by pipette. After that the compacts were placed in the 30 mesh sieve (Dual Manufacturing Co. Inc., Franklin Park, Ill.) covered by GoreTex™ and reacted in the reactor at 90° C. and 2.36 atm as described in the last section.

TABLE 4

Dimensional and mass changes of the sample after drying and g-rHLPD processes

| Sample ID | Drying (%) | | g-rHLPD (%) | | mass | |
|---|---|---|---|---|---|---|
| | Axial | Diametric | Axial | Diametric | $m_{dry}$ | $m_{hlps}$ |
| CCS1 | 0.90 ± 1.60 | 0.02 ± 0.07 | −0.24 ± 0.29 | −0.02 ± 0.09 | 33.9 ± 1.80 | 40.8 ± 0.47 |

*Dimensions of each sample were measured using a Vernier caliper (Vernier Software & Technology, LLC. Beaverton, OR) with a minimum resolution of 10 μm.

Physical Characterizations

Bulk densities before ($\rho_{gbd}$) and after ($\rho_{rbd}$) g-rHLPD were calculated from the mass to volume ratio. Volume of the samples was calculated from the dimensions of the cylindrical samples measured earlier. Hg intrusion porosimetry (AutoPore IV 9400, Micromeritics Instrument Corporation, Norcross Ga.) of the reacted samples was performed to measure bulk density ($\rho_{rbd}$ apparent density ($\rho_{rad}$(Hg)), open porosity, and pore size distribution of reacted samples. Apparent density ($\rho_{rad}$(He)) of the reacted samples (an average of three readings) was also measured by He-pycnometry (AccuPyc 1330, Micromeritics Instrument Corporation, Norcross, Ga.). For both Hg porosimetry and He pycnometry studies, reacted samples were broken into smaller pieces (approximately 3-5 mm pieces) by using a mortar and pestle. Relative densities from He pycnometry ($\rho_r$(He)) and Hg Intrusion porosimetry ($\rho_r$(Hg)) were calculated by using S 1.5A and S 1.5B.

$$\rho_r(He) = \frac{\rho_{rbd}}{\rho_{rad}(He)} \times 100 \quad (S\ 1.5A)$$

$$\rho_r(Hg) = \frac{\rho_{rbd}(Hg)}{\rho_{rad}(Hg)} \times 100 \quad (S\ 1.5B)$$

where, $MW_{CaSiO3}$, $MW_{SiO2}$, and $MW_{CaCO3}$ are molecular weights of $CaSiO_3$, $SiO_2$, and $CaCO_3$, respectively. $\rho_{CaSiO3}$, $\rho_{SiO2}$, and $\rho_{CaCO3}$ are densities of $CaSiO_3$ (2.89 g/cm$^3$), amorphous $SiO_2$ (2.20 g/cm$^3$), and $CaCO_3$ (concomitant mixture of aragonite (2.95 g/cm$^3$) and calcite (2.71 g/cm$^3$)), respectively. Relative mass fractions of calcite and aragonite (α) in reacted products (e.g., CCS1) were estimated from Rietveld analysis (Table 6). The average $\rho_{CaCO3}$ in the mixture was then calculated from α by using the rule of mixtures. $\lambda_w$ (mol %) is the degree of carbonation of CCS1 samples from weight change measurements (details are described in section S1.5 and Table 7).

Relative theoretical density ($\rho_r$ (Th)) was calculated by using equation S1.5D.

$$\rho_r(Th) = \frac{\rho_{rbd}}{\rho_{rtd}(Th)} \times 100 \quad (S\ 1.5D)$$

The results from all the measurements are given in Table 5. Similar values of $\rho_r$(He) (~80.66) and $\rho_r$(Th) (80.07) indicate that there is virtually no closed porosity in the structure. Pore size distribution data for the reacted sample (CCS1) by Hg-Porosimetry is given in Fig. S1.

TABLE 5

Data obtained from density and porosity measurements.

| | Green Body (g/cm$^3$) | | g-rHLPD | | | | | | | | |
|---|---|---|---|---|---|---|---|---|---|---|---|
| | | | Bulk Density (g/cm$^3$) | | Apparent Density (g/cm$^3$) | | Theoretical Density (g/cm$^3$) | Relative Density (%) | | | |
| Sample | $\rho_{gd}$ | $\rho_{grel}$ (%) | $\rho_{rbd}$ | $\rho_{rbd}$ (Hg) | $\rho_{rad}$ (Hg) | $\rho_{rad}$ (He) | $\rho_{rtd}$ (Th) | $\rho_r$ (Hg) | $\rho_r$ (He) | $\rho_r$ (Th) |
| CCS1 | 1.84 ± 0.02 | 63.66 ± 0.69 | 2.17 ± 0.01 | 2.19 | 2.78 | 2.69 ± 0.02 | 2.71 ± 0.01 | 78.78 | 80.66 ± 0.37 | 80.07 ± 0.37 |

Theoretical density ($\rho_{rtd}$ (Th)) was calculated by using the rule of mixtures (S 1.5C).

$$\rho_{rtd}(Th) = \frac{((1-\lambda_w) \times MW_{CaSiO3} + \lambda_w \times MW_{SiO2} + \lambda_w \times MW_{CaCO3})}{\left(\frac{(1-\lambda_w) \times MW_{CaSiO3}}{\rho_{CaSiO3}} + \frac{\lambda_w \times MW_{SiO2}}{\rho_{SiO2}} + \frac{\lambda_w \times MW_{CaCO3}}{\rho_{CaCO3}}\right)} \quad (S1.5C)$$

Pore size distribution of CCS1 measured by Hg-Porosimetry is shown in FIG. 6.

Structural and Thermal Analysis

XRD analysis was conducted using a Bruker D4 Diffractometer (Bruker AXS

Inc., Madison, Wis.) with Cu radiation at 45 kV and 40 mA over the angular range of 10-90° 2θ, step size of 0.0157°, and exposure time of 500 s per step. Quantification of the crystalline phases in both $CaSiO_3$ powder and the reacted samples were made via Rietveld refinement by using Jade 9.3.2 software with the structural model from the ICSD (Inorganic Crystal Structure Database, FIZ Karlsruhe, Eggenstein_Leopoldschafen, Germany) database. The profile fitting was performed by using a Pearson VII function with a manually fitted background. The lattice parameter, peak profiles (Cagliatti model) and the isotropic thermal parameters were refined. These measurements were performed by H&M Analytical Services, Inc. (Allentown, N.J.).

Figure S2 shows XRD data obtained from the $CaSiO_3$ powder and reacted sample (CCS1). The quantification measurement of phase composition by Rietveld refinement is shown in Table 6. All the observed peaks can be indexed to $CaSiO_3$ (PDF04-011-2265) and $CaCO_3$ phases (aragonite (PDF04-013-9616) and calcite (PDF97-004-0113)).

TABLE 6

Crystalline phase compositions of $CaSiO_3$ powder and CCS1 sample (wt %)

| Sample | Wollastonite ($CaSiO_3$) | Calcite ($CaCO_3$) | Aragonite ($CaCO_3$) | $SiO_2$ |
|---|---|---|---|---|
| NYAD 400 | 97.0 | 1.1 | — | 1.9 |
| CCS 1 | 57.9 | 12.3 | 29.8 | — |

Figure 7:
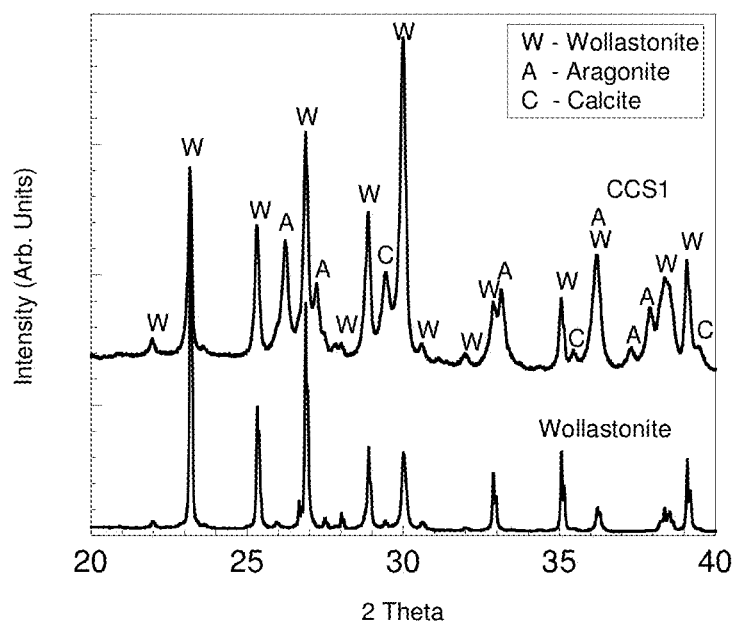
FIG. 7 represents XRD patterns of wollastonite and reacted CCS1 sample.

XRD patterns of wollastonite and reacted CCS1 sample are shown in FIG. 7.

Thermogravimetric Analysis (TGA) and Differential Scanning calorimetry (DSC) were performed by a TGA-DSC (Q600 SDT, TA Instruments Ltd., New Castle, Del.) heating up to 1000° C. with a heating rate of 10° C./min in a nitrogen atmosphere (99.5% purity, Parker Balston Nitrogen generator, N2-14, RJM Sales, Scotch Plains, N.J.) at a flow rate of 100 ml/min. The gases evolved during the decomposition of the reacted samples during a TGA experiment were detected by Nicolet Fourier Transform Infrared Spectroscopy (FT-IR) (Nicolet FT-IR 6700, Thermo Fisher Scientific Inc., West Palm Beach, Fla.) coupled with a Thermo Scientific TGA-IR Interface. The scan speed for FT-IR was 16 scans at 0.5 cm$^{-1}$ spectrum resolution. An infrared spectrum was automatically collected after every 63 s during TGA/DSC measurement. A sample of ~62 mg was used for each test. Figure S3 (a) shows 3D FT-IR profile of the gases evolved during heating of the reacted sample (CCS1). Water vapor at a concentration of ~0.6 wt % was observed from the bands (1100-2200 cm$^{-1}$, >3000 cm$^{-1}$) at low temperatures (<200° C.), whereas $CO_2$ gas (2240-2450 cm$^{-1}$, 580-730 cm$^{-1}$, 3550-3800 cm$^{-1}$) becomes dominant after 200° C., indicating that the carbonate phase is formed during g-rHLPD process, in agreement with XRD results (Table 6 and Fig. S2). Figure S3 (b) is the corresponding TGA-DSC plot. By comparing with Fig. S3 (a), the plot can be mainly divided into four regimes: (i) 40-200° C.—removal of physical adsorbed water, (ii) 200-800° C.—decomposition of $CaCO_3$, (iii) 800-840° C.—onset of $CaSiO_3$ formation and continuation of $CaCO_3$ decomposition, and (iv) 840-1000° C.—$CaSiO_3$ formation (no weight change).

Figure 8:
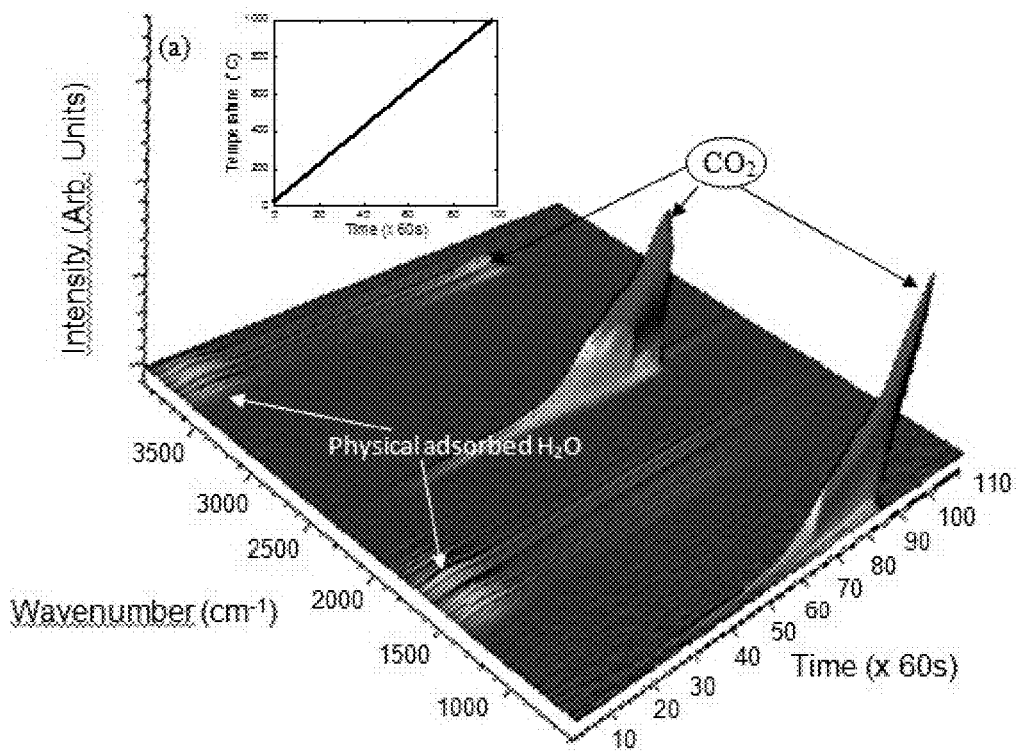
FIG. 8 represents 3D plot of wavenumber (x-axis) versus intensity (z-axis) versus time (y axis) (inset shows the profile of time versus temperature) between 40 and 1000° C. at a heating rate of 10° C./min in $N_2$ atmosphere is shown
Figure 9:
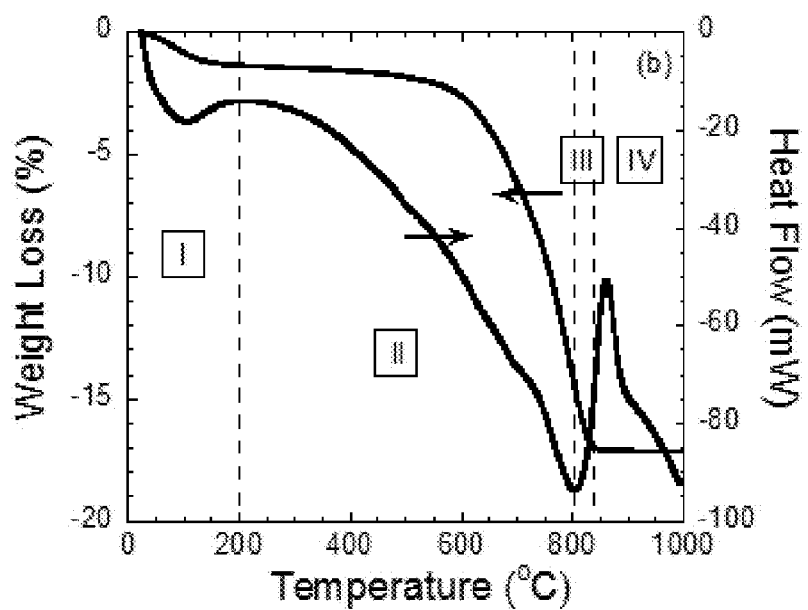
FIG. 9 presents TGA-DSC of CCS1.

3D plot of wavenumber (x-axis) versus intensity (z-axis) versus time (y axis) (inset shows the profile of time versus temperature) between 40 and 1000° C. at a heating rate of 10° C./min in $N_2$ atmosphere is shown in FIG. 8, and TGA-DSC of CCS1 is shown in FIG. 9.

Degree of Carbonation (λ)

Degree of carbonation is defined as mole percentage of carbonated $CaSiO_3$ after g-rHLPD. Net weight change, before and after the g-rHLPD was used to calculate degree of carbonation ($\lambda_w$) (Eq. S 1.1), assuming all coming from the formation of calcium carbonate formed during reaction.

$$\lambda_w = \frac{(m_{HLPS} - m_{dry})}{MW_{CO2}} \times \left(\frac{MW_{CaSiO3}}{m_{dry}}\right) \times 100 \qquad (S\ 1.1)$$

where, $MW_{CaSiO3}$ and $MW_{CO2}$ are molecular weights of $CaSiO_3$ and $CO_2$, and respectively.

Degree of carbonation ($\lambda_{TGA}$) was also estimated from the TGA results. A set of three samples (~20-30 mg) were carefully collected from outer (<3 mm from the outer periphery) and inner (<3 mm from the center) regions of the reacted samples (CCS1). The $W_{CO2}$ was measured by TGA (Q5000 IR, TA Instruments Ltd., New Castle, Del.), and analyzed by Eq. 1.4 to calculate $\lambda_{TGA}$ of inner and outer sections (Table 7). The wt % of $CO_2$ ($W_{CO2}$) in the sample was measured from the weight loss between 150 and 1000° C. Reactions S1.2 and S1.3 show the carbonation of $CaSiO_3$ during g-rHLPD and decomposition of $CaCO_3$ during heating. The degree of carbonation ($\lambda_{TGA}$) was calculated by equations S1.4A-D.

$$CaSiO_{3(s)} + CO_{2(g)} = CaCO_{3(s)} + SiO_{2(s)} \qquad (S\ 1.2)$$

$$CaCO_{3(s)} = CaO_{(s)} + CO_{2(g)} \qquad (S\ 1.3)$$

$$M_{re\text{-}CaSiO3} = M_{CO2} = \left[\frac{W_{CO2}}{MW_{CO2}}\right] \qquad (S1.4A)$$

$$M_{CaO} = M_{SiO2} = M_{CO2} \qquad (S\ 1.4B)$$

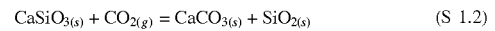
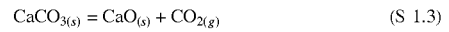

$$\lambda_{TGA} = \left[\frac{(M_{re\text{-}CaSiO3})}{(M_{un\text{-}CaSiO3} + M_{re\text{-}CaSiO3})}\right] \times 100 \qquad (S\ 1.4D)$$

where, $M_{re\text{-}CaSiO3}$ is the moles of reacted $CaSiO_3$, $M_{un\text{-}CaSiO3}$ is moles of unreacted $CaSiO_3$, $M_{CO2}$ is moles of $CO_2$ sequestered in the sample, $M_{CaO}$ is moles of CaO remaining in $M_{re\text{-}CaSiO3}$, $M_{SiO2}$ is moles of $SiO_2$ remaining in $M_{re\text{-}CaSiO3}$, and $MW_{SiO2}$ and $MW_{SiO2}$ are the molecular weights of CaO and $SiO_2$.

Degree of carbonation ($\lambda_{calcimetry}$) was also determined from average of 10 samples by using volumetric method in Calcimeter (Eijkelkamp, ART. No. 08.53, Agrisearch Equipment, USA). The carbonates present in the sample were converted into $CO_2$ by adding hydrochloric acid to the sample. As a result of the pressure of the $CO_2$ released, the level of water in the burette was raised. The difference in level measured was used to measure the released quantity of $CO_2$, from which the carbonate content can be calculated. The degree of carbonation ($\lambda_{calcimetry}$) was calculated by equations S1.4E G.

$$M_{re\text{-}CaSiO3} = M_{CaCO3} = \left[\frac{W_{CaCO3}}{MW_{CaCO3}}\right] \qquad (S1.4E)$$

$$M_{un\text{-}CaSio3} = \left[\frac{(100 - M_{CaCO3} \times MW_{CaCO3} - M_{SiO2} \times MW_{SiO2})}{(MW_{CaSiO3})}\right] \qquad (S\ 1.4F)$$

$$\lambda_{Calcimetry} = \left[\frac{(M_{re\text{-}CaSiO3})}{(M_{un\text{-}CaSiO3} + M_{re\text{-}CaSiO3})}\right] \times 100 \quad \text{(S 1.4G)}$$

TABLE 7

Degree of carbonation for CCS1 sample (mol %)

| $\lambda_w$ | $\lambda_{Calcimetry}$ | $\lambda_{TGA}$ inner | $\lambda_{TGA}$ outter | $\lambda_{XRD}$ |
|---|---|---|---|---|
| 47.5 ± 2.7 | 46.9 ± 2.7 | 49.4 ± 2.9 | 50.7 ± 1.1 | 45.8 |

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents. All patents and publications discussed herein are incorporated in their entirety by reference thereto.

What is claimed is:

1. A method of producing a monolithic ceramic body from a porous matrix, comprising:
   providing a porous matrix having interstitial spaces, wherein the porous matrix further comprising a deliquescent solid;
   providing an infiltrating medium comprising a solvent and at least one reactive species; wherein the solvent is an inert medium that is not chemically reactive with the porous matrix;
   infiltrating at least a portion of the interstitial space of the porous matrix with the infiltrating medium;
   wherein the solvent is in a liquid phase when in the portion of the interstitial space of the porous matrix;
   wherein the infiltrating medium flows through the porous matrix;
   wherein the at least one reactive species, when in a portion of the interstitial space of the porous matrix, reacts with a portion of the porous matrix to form a product, wherein the product fills at least a portion of the interstitial space.

2. The method according to claim 1, wherein the solvent and at least one reactive species are in a gaseous phase.

3. The method according to claim 1, wherein the solvent and at least one reactive species are in a liquid phase.

4. The method according to claim 1, wherein the solvent is in a liquid phase and the at least one reactive species is in a gaseous phase.

5. The method according to claim 1, wherein the infiltrating medium is mechanically convected through the porous matrix.

6. The method according to claim 5, wherein the mechanically convected comprises one of pressurized flow, capillary electro-osmotic flow, magneto-osmotic flow, and temperature- and chemical-gradient driven flow.

7. The method according to claim 1, the monolithic ceramic body has a degree of pore saturation value of from about 15% to about 70%.

8. The method according to claim 7, the degree of pore saturation value is about 50%.

9. A method of forming a monolithic body from a porous matrix comprising:
   providing a porous matrix having interstitial spaces;
   introducing a deliquescent solid into at least a portion of the interstitial spaces of the porous matrix;
   infiltrating at least a portion of the porous matrix with an infiltrating medium, wherein the infiltrating medium comprises a solvent and at least one reactive species, wherein the solvent is an inert medium that is not chemically reactive with the porous matrix, and wherein the solvent contacts the deliquescent solid;
   wherein the at least one reactive species, when in a portion of the interstitial space of the porous matrix, reacts with a portion of the porous matrix to form a product, wherein the product fills at least a portion of the interstitial space.

10. The method according to claim 9, wherein the solvent and at least one reactive species are in a gaseous phase.

11. The method according to claim 9, wherein the solvent and at least one reactive species are in a liquid phase.

12. The method according to claim 9, wherein the solvent is in a liquid phase and the at least one reactive species is in a gaseous phase.

13. The method according to claim 9, wherein the infiltrating at least a portion of the porous matrix with an infiltrating medium further comprises mechanically convecting the infiltrating medium through the porous matrix.

14. The method according to claim 13, wherein the mechanically convecting comprising one of pressurized flow, electro-osmotic flow, magneto-osmotic flow, or temperature- and chemical-gradient driven flow.

15. The method according to claim 9, the monolithic ceramic body has a degree of pore saturation value of from about 15% to about 70%.

16. The method according to claim 15, the degree of pore saturation value is about 50%.

17. The method according to claim 9, wherein, after the solvent contacts the deliquescent solid, the solvent and the deliquescent solid are in a liquid phase.

* * * * *